(12) United States Patent
Kitada

(10) Patent No.: US 8,934,494 B2
(45) Date of Patent: Jan. 13, 2015

(54) TRANSMISSION SYSTEM, TRANSMISSION APPARATUS, DESTINATION MANAGEMENT APPARATUS

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 13/170,699

(22) Filed: Jun. 28, 2011

(65) Prior Publication Data

US 2012/0002676 A1 Jan. 5, 2012

(30) Foreign Application Priority Data

Jun. 30, 2010 (JP) ................................. 2010-148582

(51) Int. Cl.
*H04L 12/28* (2006.01)
*H04H 20/71* (2008.01)
*H04L 12/935* (2013.01)
*H04L 12/721* (2013.01)
*H04L 12/723* (2013.01)
*H04L 12/713* (2013.01)

(52) U.S. Cl.
CPC ............. *H04L 49/3009* (2013.01); *H04L 45/36* (2013.01); *H04L 45/50* (2013.01); *H04L 45/586* (2013.01)
USPC ............ 370/400; 370/389; 370/255; 370/312

(58) Field of Classification Search
USPC ......................................................... 370/400
See application file for complete search history.

(56) References Cited

U.S. PATENT DOCUMENTS

2006/0072565 A1* 4/2006 Yazaki et al. ................. 370/389
2010/0040072 A1 2/2010 Kitada

FOREIGN PATENT DOCUMENTS

| JP | 09-064900 A | 3/1997 |
| JP | 2002-111700 A | 4/2002 |
| JP | 2010-045657 A | 2/2010 |

* cited by examiner

*Primary Examiner* — Noel Beharry
(74) *Attorney, Agent, or Firm* — Oblon, Spivak, McClelland, Maier & Neustadt, L.L.P.

(57) ABSTRACT

A transmission system including: transmission apparatuses; and a destination management apparatus including: first ports which are coupled to the transmission apparatuses; and a first processor configured to manage an address entry which indicates a relation between the first port which receives the frame from among the first ports and a transmission source address included in the frame; and to transfer the frame received by one of the first ports, to the first port in association with the transmission destination address from among the first ports based on the address entry, wherein one of the transmission apparatuses including: second ports which are coupled to another transmission apparatus in the network; a third port which is coupled to the destination management apparatus; and a second processor configured to transmit the frame received by one of the second ports only to the third port.

10 Claims, 33 Drawing Sheets

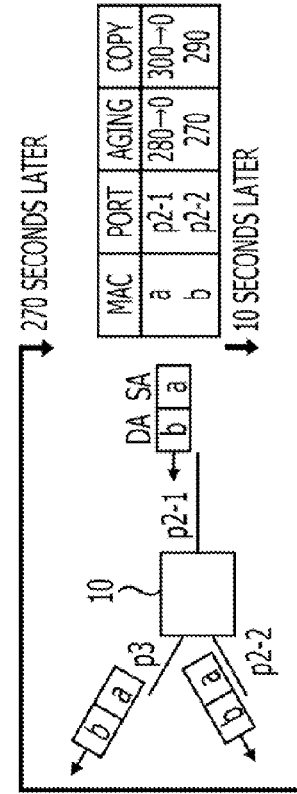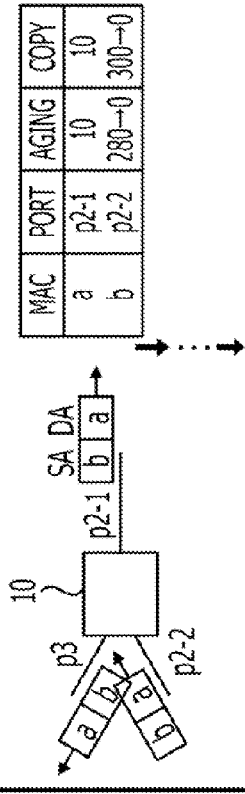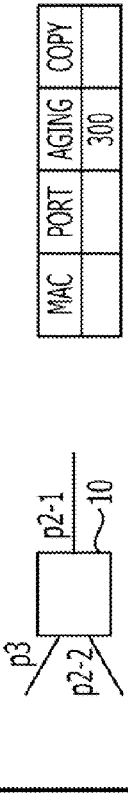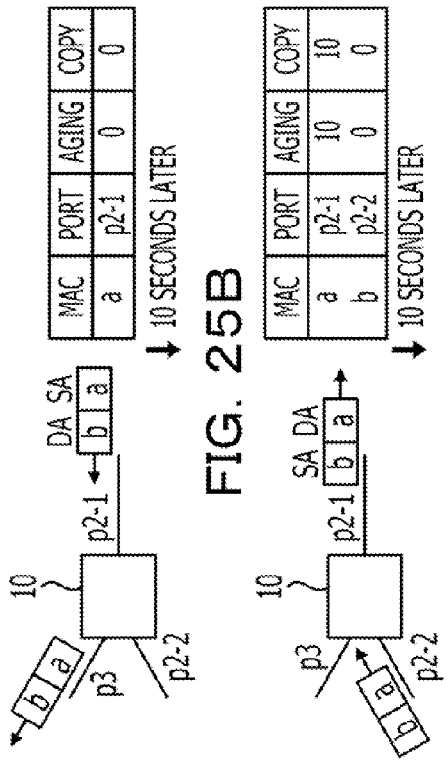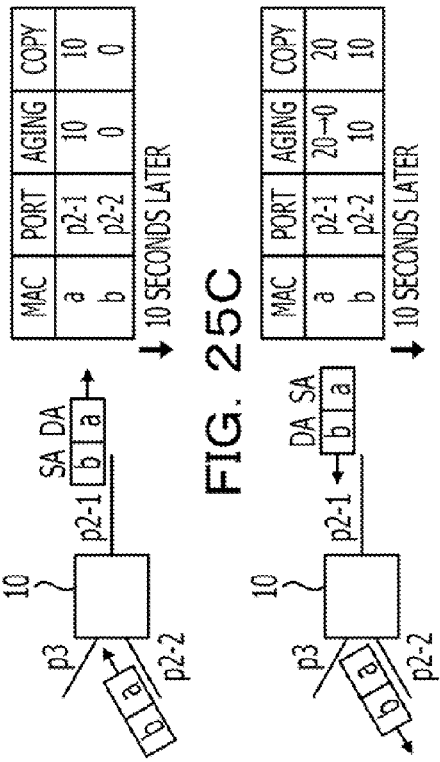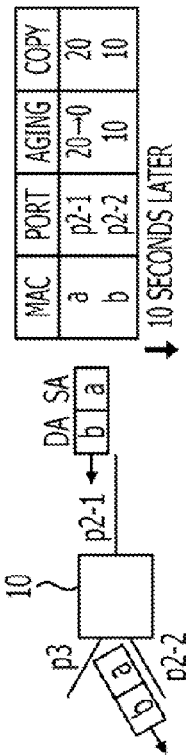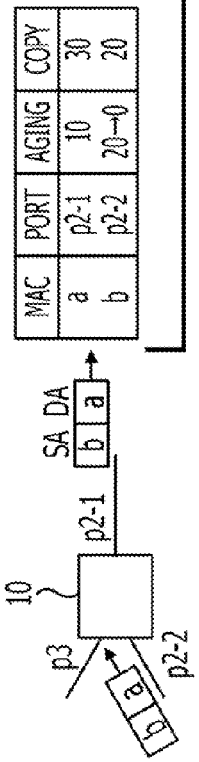

TRANSMISSION SYSTEM, TRANSMISSION APPARATUS, DESTINATION MANAGEMENT APPARATUS

CROSS-REFERENCE TO RELATED APPLICATIONS

This application is based upon and claims the benefit of priority from the prior Japanese Patent Application No. 2010-148582 filed on Jun. 30, 2010, the entire contents of which are incorporated herein by reference.

FIELD

The embodiments discussed herein are related to a transmission system, a transmission apparatus, a destination management apparatus, a control unit, a transmission control program, and a computer-readable recording medium that records the transmission control program. The transmission system is used, for example, in a network in which a frame is transmitted based on a transmission destination address included in the frame.

BACKGROUND

Ethernet has low cost of the apparatus and many choices of communication speed, so that the management operation is easy. Therefore, Ethernet has been widely spread as a Local Area Network (LAN) such as a corporate LAN or a wide-area LAN service such as a Layer2-Virtual Private Network (L2-VPN). The wide-area LAN service is a network in which a protocol of a layer 3, a higher protocol of a layer 2, is not selected, that is, an Internet Protocol (IP) topology-free network where a user may freely design and operate an IP network.

For example, the user may use a dynamic routing protocol such as Routing Information Protocol/Open Shortest Path First (RIP/OSPF) to perform dynamic path control. Furthermore, for example, the user perform simple path setting by using a static route. Patent Document 1 proposes a method for determining whether or not occurrence of flooding with respect to an address meets a prescribed condition in a frame switching apparatus that switches the frame, receiving a prescribed report transmitted from another switch that stores the same address entry as the address that meets the prescribed condition, and registering the address entry by which the address that meets the prescribed condition is associated with a port that receives the report.

Patent Document 2 proposes that if a prescribed LAN terminal does not register a Media Access Control (MAC) address of another LAN terminal, an address resolution request is transmitted to a router, and the router transmits the address resolution request to the other LAN terminal and updates an address resolution table based on address resolution information sent back from the other LAN terminal to transmit the address resolution information to the prescribed LAN terminal.

Moreover, Patent Document 3 proposes a method for providing an Address Resolution Protocol server module in a switching hub, giving all the broad cast frames received by an interface module to the above-described ARP server module, and replying from a reception port after an ARP reply frame is built if there is an entry corresponding to the network address.

[Patent Document 1] Japanese Laid-open Patent Publication No. 2010-045657

[Patent Document 2] Japanese Laid-open Patent Publication No. 2002-111700

[Patent Document 3] Japanese Laid-open Patent Publication No. 09-064900

SUMMARY

According to an aspect of the invention, a transmission system including: a plurality of transmission apparatuses to transmit a frame in a network; and a destination management apparatus that includes, a plurality of first ports coupled to the plurality of transmission apparatuses to transmit and receive the frame; and a first processor configured, to manage an address entry which indicates a relation between the first port which receives the frame from among the plurality of first ports and a transmission source address included in the frame; and to transfer the frame received by one of the plurality of first ports, to the first port in association with the transmission destination address from among the plurality of first ports based on the address entry; wherein one of the plurality of transmission apparatuses includes, a plurality of second ports coupled to transmit to and receive the frame from at least one other transmission apparatuses in the network; a third port which is coupled to the destination management apparatus; a storage unit to store an address entry indicating a relation between the second port which receives the frame from among the plurality of second ports; and a second processor configured to transmit the frame received by one of the plurality of second ports only to the third port.

The object and advantages of the invention will be realized and attained by at least the features, elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 25A-G are diagrams illustrating an operation example of a transmission apparatus according to the third embodiment of the present application;

DESCRIPTION OF THE EMBODIMENTS

Figure 1A:
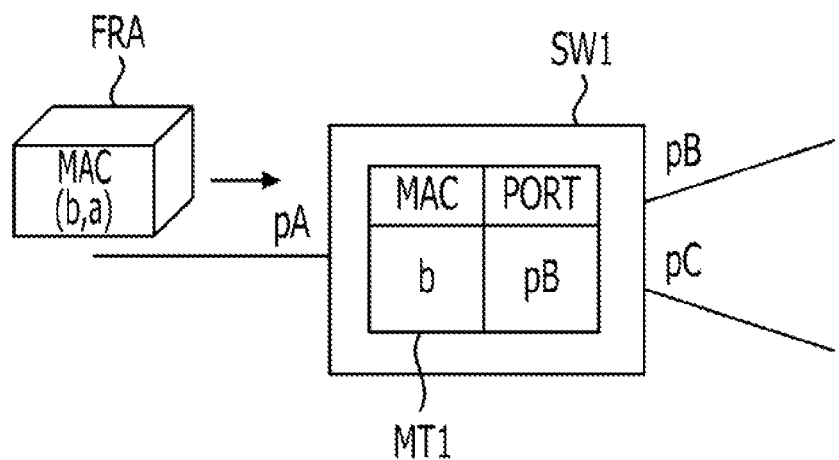
FIGS. 1A and 1B illustrate explanatory diagrams of a MAC learning method.
Figure 1B:
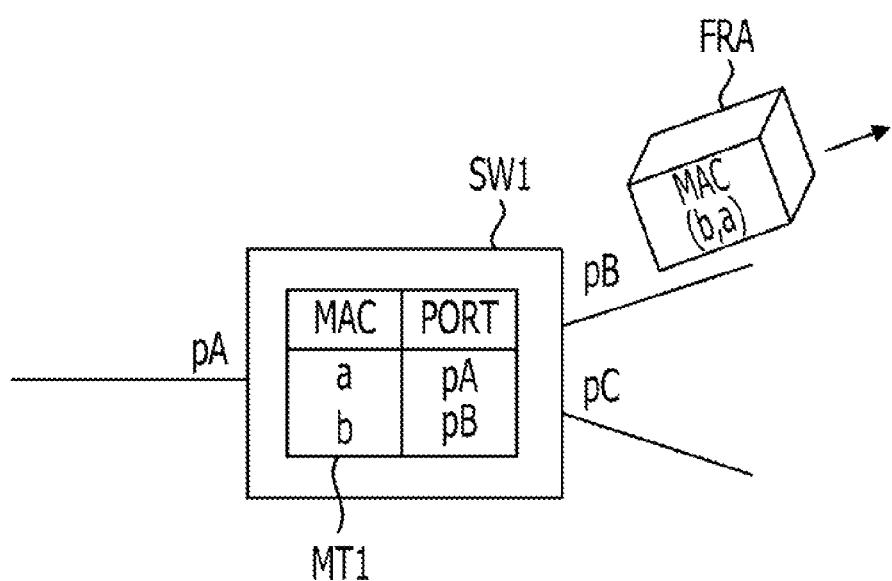

A layer 2 switch as an Ethernet switch or the like has a MAC learning function and generates a MAC table. The MAC table may be referred to as a forwarding table or a MAC address table. FIGS. 1A and 1B are explanatory diagrams of MAC learning method. A layer 2 switch SW1 illustrated in FIG. 1A receives a MAC frame having a transmission destination MAC address b and a transmission source MAC address a by a port pA.

By referring to the transmission source MAC address of the received MAC frame, the layer 2 switch SW1 learns which port has which MAC address where a node is coupled to the port pA. In the example illustrated in FIG. 1B, the layer 2 switch SW1 learns that the node with the transmission source MAC address of the MAC frame FRA is coupled to the port pA that received the MAC frame FRA. Therefore, the layer 2 switch SW1 registers an address entry, which indicates a relation between the MAC address a and the port pA, in a MAC table MT1.

Based on the learned MAC table MT1, the layer 2 switch SW1 determines an output port from which the received MAC frame FRA is output. At this time, since the transmission destination MAC address b is registered in the MAC table MT1, the layer 2 switch SW1 may receive the MAC frame FRA to the port pB that is associated with the transmission destination MAC address b.

Figure 2A:
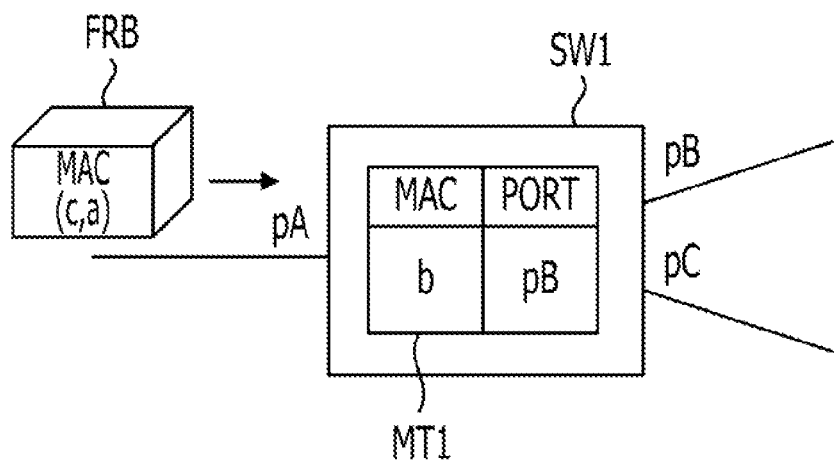
FIGS. 2A and 2B illustrate explanatory diagrams and of flooding processing.
Figure 2B:
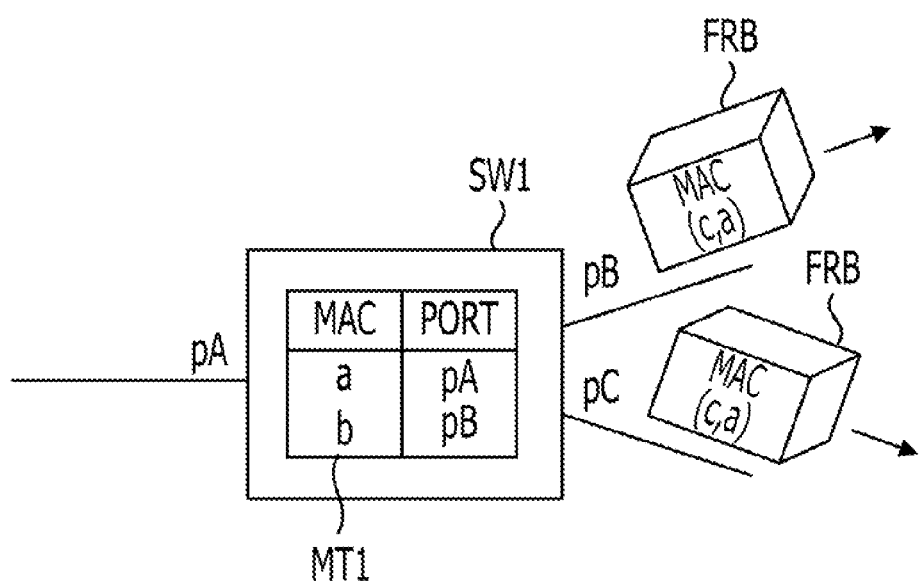

On the other hand, if the transmission destination MAC address b is not registered in the MAC table MT1, the layer 2 switch SW1 outputs the MAC frame FRA from all the ports other than the reception port. This processing is referred to as flooding. FIGS. 2A and 2B are explanatory diagrams of flooding processing when the transmission MAC address is unlearned. The layer 2 switch SW1 illustrated in FIG. 2A receives a MAC frame FRB, which includes a transmission source MAC address c and a transmission source MAC address a, by the port pA.

Figure 3:
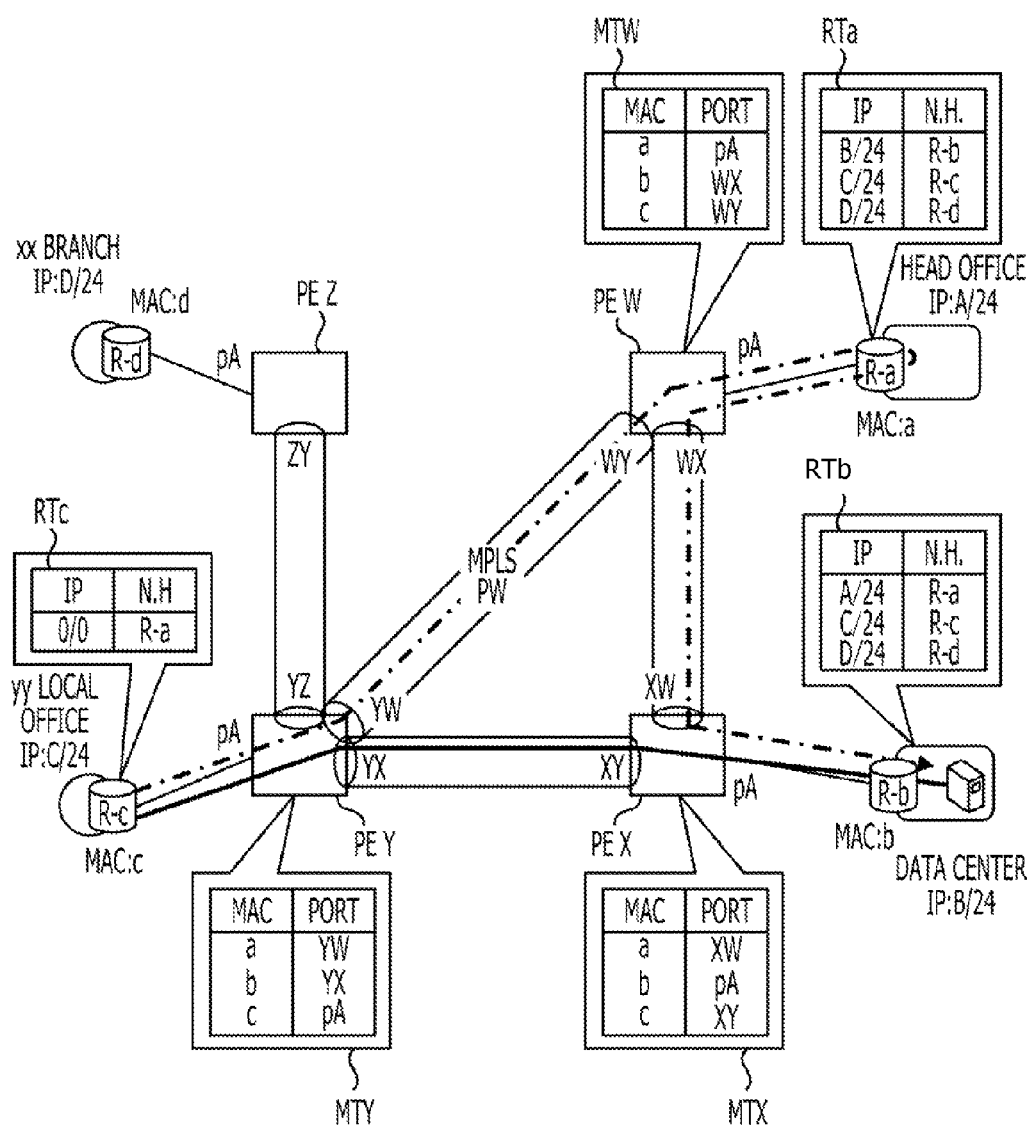
FIG. 3 is a diagram illustrating a first example of a network in which flooding may occur due to MAC learning omission.

The MAC table MT1 included in the layer 2 switch SW1 does not register the transmission destination MAC address c of the received MAC frame. Therefore, as illustrated in FIG. 2B, the layer 2 switch SW1 outputs the MAC frame FRM from all the ports pB and pC other than the port pA that received the MAC frame FRB. As a result, if forwarding of the frame is performed by the MAC learning function of the layer 2 switch, the network management operation is easy. Meanwhile, undesired flooding may occur in topology of the layer 3 due to the MAC learning omission. FIG. 3 is a diagram illustrating a first example of a network in which the flooding may occur due to the MAC learning omission.

The network illustrated in FIG. 3 is a wide-area LAN that couples the head office of a company, a data center, a xx branch, and a yy local office thereof with each other. In FIG. 3, a Provider Edge (PE) W, a PE X, a PE Y, and a PE Z are network components for switching the MAC frame in the wide-area LAN. Furthermore, in FIG. 3, the PE W, the PE X, the PE Y, and the PE Z are mutually coupled with each other by a Multi Protocol Label Switching-Pseudo Wire (MPLS-PW).

The LAN in the head office has a network address A/24 and is coupled to the wide-area LAN through a router R-a coupled to the PE W. The MAC address of the router R-a is a. The LAN in the data center has a network address B/24 and is coupled to the wide-area LAN through a router R-b coupled to the PE X. The MAC address of the router R-b is b.

The LAN in the yy local office has a network address C/24 and is coupled to the wide-area LAN through a router R-c coupled to the PE Y. The MAC address of the router R-c is c. The LAN in the xx branch has a network address D/24 and is coupled to the wide-area LAN through a router R-d coupled to the PE Z. The MAC address of the router R-d is d.

The port pA of the PE W coupled to the LAN in the head office is coupled to the router R-a. A port WX of the PE W is coupled to the PE X. A port WY of the PE W is coupled to the PE Y. The port pA of the PE X that is coupled to the LAN in the data center is coupled to a router R-b. The port XW of the PE X is coupled to the PE W. A port XY of the PE X is coupled to the PE Y.

The port pA of the PE Y coupled to the LAN in the yy local office is coupled to the router R-c. The port XY of the PE Y is coupled to the PE X. A port YW of the PE Y is coupled to the PE W. A port YZ of the PE Y is coupled to the PE Z. The port pA of the PE Z coupled to the LAN in the xx branch is coupled to the router R-d. A port ZY of the PE Z is coupled to the PE Y.

Reference numerals MTW, MTX, and MTY indicate MAC tables used by the PE W, PE X, and PE Y for forwarding of a frame. The MAC tables MTW, MTX, and MTY indicate a port from which the MAC frame with the MAC address as the transmission destination address is output. Routing tables RTa, RTb, and RTc indicate routing tables used for routing of a packet by routers R-a, R-b, and R-c, respectively.

The routing tables RTa, RTb, and RTc include an IP field and a Next Hop (N.H.) field.

In the routing tables RTa, RTb, and RTc, the IP field stores the network address, and the N.H. field stores the IP address of the next transfer router of the packet to be transmitted to the network address stored in the IP field. For example, the routing table RTa indicates that the next transfer destination router of the packet to be transmitted to the network address B/24 is the router R-b and that the next transfer destination router of the packet to be transmitted to the network address C/24 is the router R-c. The routing table RTa indicates that the next transfer destination router of the packet to be transmitted to the network address D/24 is the router R-d.

For example, the routing table RTb indicates that the next transfer destination router of the packet to be transmitted to the network address A/24 is the router R-a and that the next transfer destination router of the packet to be transmitted to the network address C/24 is the router R-c. The routing table RTb indicates that the next transfer destination router of the packet to be transmitted to the network address D/24 is the router R-d.

In the example of the wide-area LAN illustrated in FIG. 3, the router R-c of the yy local office is simply given with a default route for transmitting the packet to the head office, and the routing tables of the routers R-a and R-b of the head office and the data center have all the paths. The router R-a of the head office distributes traffic from the yy local office and the xx branch. The above-described network configuration has an advantage that resetting of a static route, which is performed when a router is added and deleted, may be omitted.

For example, if the terminal of the LAN in the yy local office accesses the data center, the packet transmitted from the yy local office to the data center is transmitted to the router R-a of the head office from the yy local office as indicated with a dashed line in FIG. 3, and is then transferred from the router R-a of the head office to the data center. As indicated with a solid line in FIG. 3, the packet transmitted from the data center to the yy local office is transmitted from the data center to the yy local office without being transmitted through the router R-a of the head office.

Therefore, the traffic between the yy local office and the data center goes through different IP paths for upward and downward. That is, the traffic goes through an asymmetric IP path for upward and downward. When the yy local office accesses the data center, the PE Y and the PE W on the path may learn the MAC address a of the router R-a of the LAN in the head office by an Address Resolution Protocol (ARP) performed by the router R-c of the yy local office.

The transmission source MAC address of the MAC header transmitted from the data center to the yy local office is a MAC address b of the router R-b of the LAN in the data center. Accordingly, in the traffic of the data center and the yy local office, the frame with the MAC address a as the transmission source address is not transmitted. As a result, the address entry related to the MAC address a is deleted from a MAC table MTY of the PE Y by the aging processing of the MAC table.

For example, the router R-c transmits an ARP Request to the PE Y to perform ARP resolution on the MAC address of the router R-a of the head office. The APR request is broadcasted from the PE Y to each of the routers R-a, R-b, and R-c. Due to the broadcast (flooding) of the APR request, the ARP table held by the routers R-a, R-b, and R-d may hold the entry in which the IP address of the router R-c is associated with the MAC address of the router R-c. Furthermore, due to the broadcast (flooding) of the ARP request, the MAC table of each PE may hold an entry in which the MAC address c is associated with the port from which the frame with the MAC address c is transmitted.

The router R-a that received the above-described ARP Request from the PE Y unicasts an ARP reply to the router R-c. The router R-c may perform the ARP resolution on the MAC address of the router R-a. However, the MAC table held by the PE Y is subjected to aging, the address entry related to the MAC address a is deleted.

Figure 4:
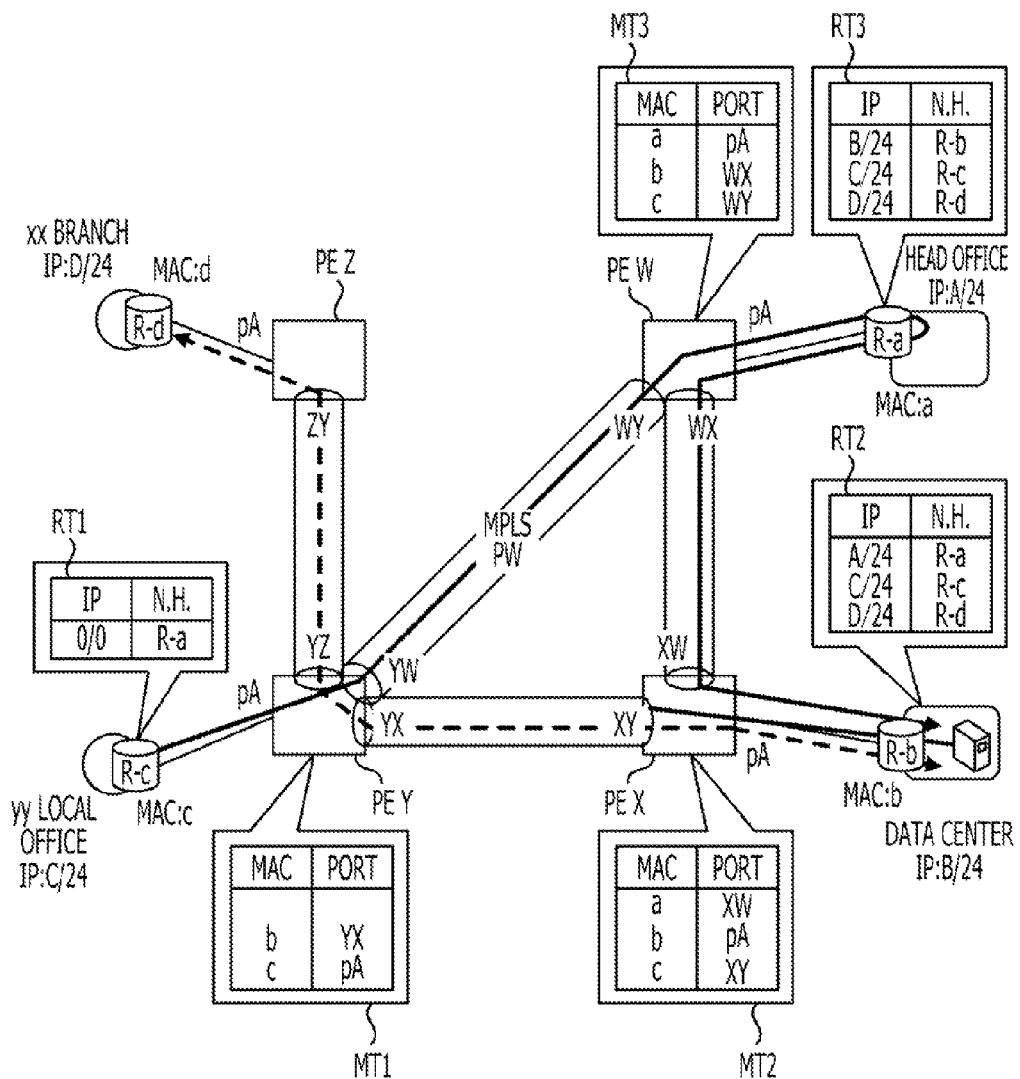
FIG. 4 is a diagram illustrating a state where flooding occurs in a network illustrated in FIG. 3.

FIG. 4 illustrates a state where the address entry related to the MAC address a is deleted from the MAC table MTY of the PE Y after the aging processing of the MAC table is performed. Since the MAC table MTY does not have the address entry related to the MAC address a, the frame that transfers the packet to the data center through the head office from the yy local branch is subjected to the flooding processing in the PE Y.

In this manner, in the traffic between the yy local office and the data center goes through the IP path that is asymmetric for upward and downward, the transmission frame from the data center to the yy local office does not include the MAC address a of the router R-a of the head office as the transmission source address. Therefore, in the PE Y through which the traffic between the yy local office and the data center passes, the address entry of the MAC address a of the router R-a of the head office may be deleted by the aging of the MAC table.

For example, the aging of the MAC table is regularly performed for approximately 5 minutes, and the aging of the ARP table of the router is performed for tens of minutes to several hours. That is, in general, the aging period of the MAC table is shorter than the aging period of the ARP table. Accordingly, as illustrated in the MT1 in FIG. 4, after the MAC address a of the router R-a of the head office is deleted from the MT1 of the PE Y, until the MAC address a is deleted from the ARP table of the router R-c, the frame transmitted from the yy local office to the data center is subjected to the flooding processing in the PE Y illustrated with the dotted line in FIG. 4.

Figure 5:
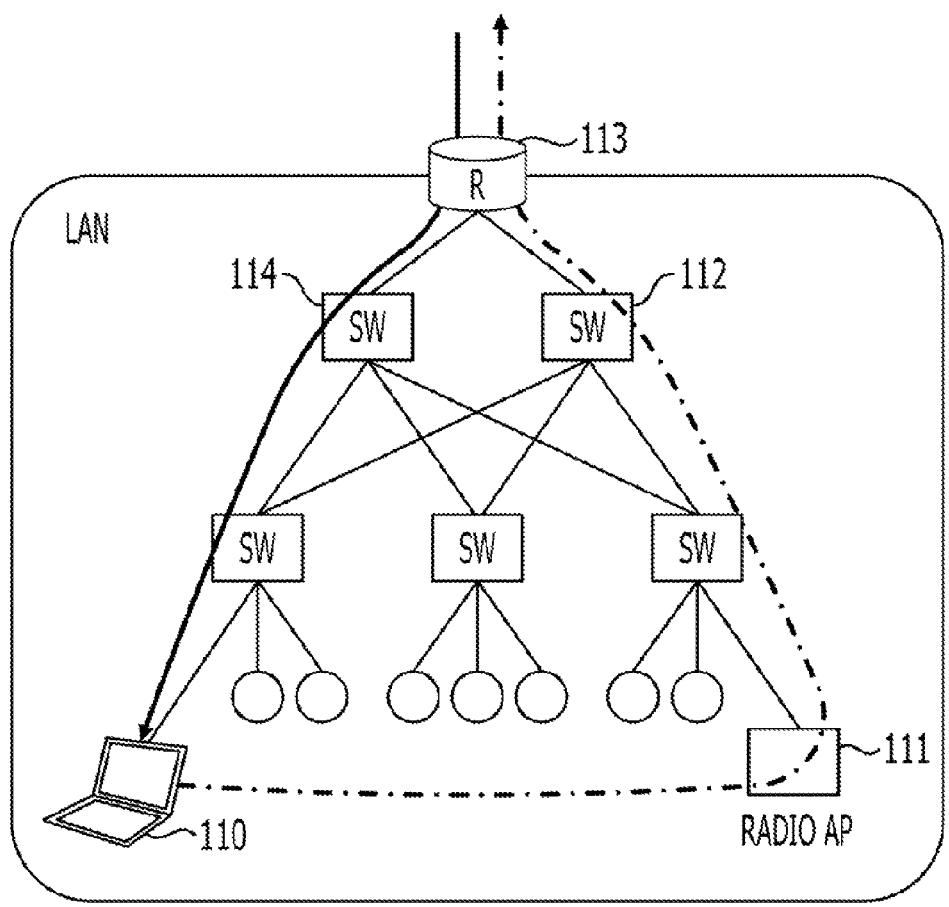
FIG. 5 is a diagram illustrating a second example of a network in which flooding may occur due to MAC learning omission.

In the above-described state, undesired flooding continuously occurs. The communication may be hardly performed because of band compression if the line capacity is small. In addition to the network configurations illustrated in FIG. 3 and FIG. 4, there is another network configuration in which the flooding may occur due to the MAC learning omission. FIG. 5 is a diagram illustrating a second example of the network in which the flooding occurs due to the MAC learning omission.

A terminal 110 includes two network interfaces for a wired network and a radio network. The interface for the wired network has the MAC address a, and the interface for the radio network has the MAC address b. An upward frame is transferred to a router (R) 113 through a radio access point (AP) 111 and the layer 2 switch (SW) 112. A downward frame is transferred to the terminal 110 through a layer 2 switch (SW) 114.

Figure 6:
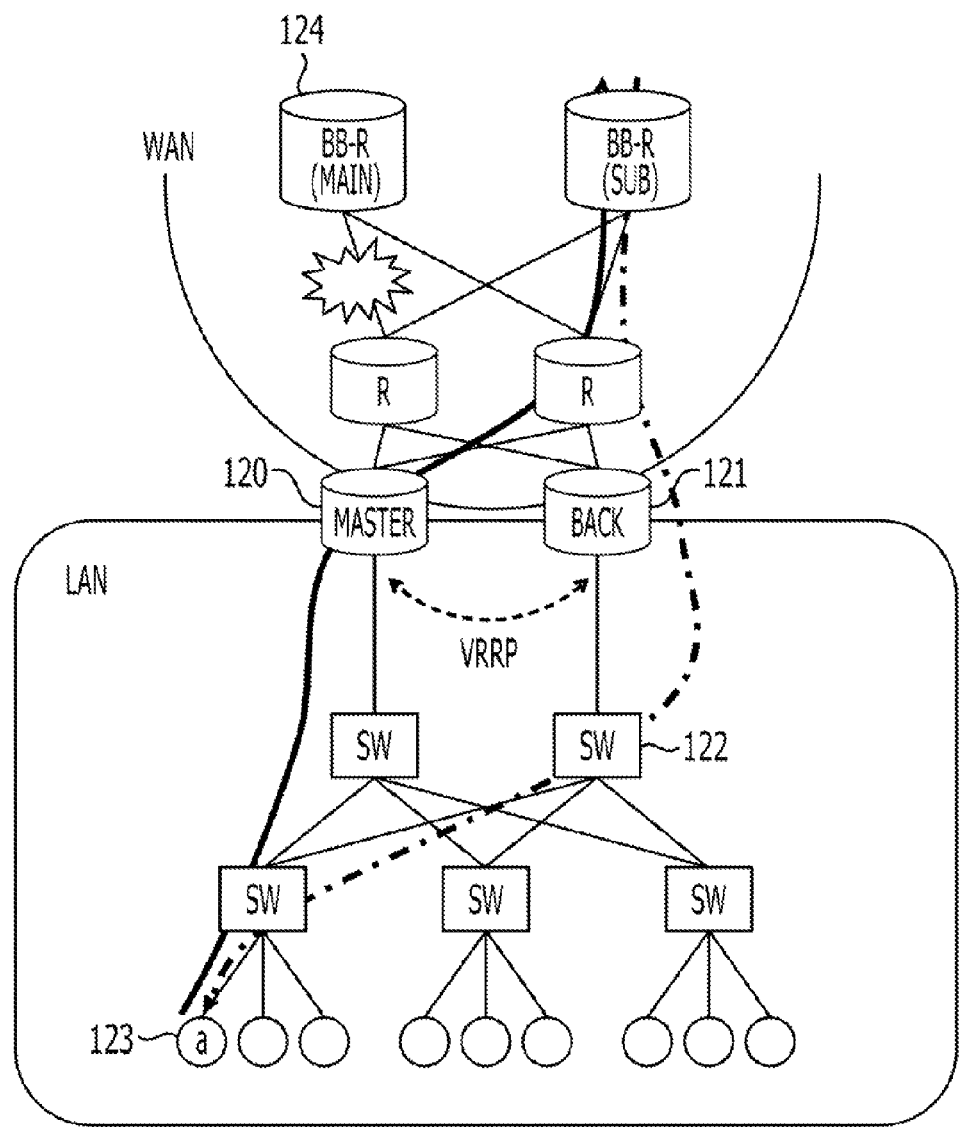
FIG. 6 is a diagram illustrating a third example of a network in which flooding may occur due to MAC learning omission.

According to the above-described network configuration, as in the network illustrated in FIGS. 3 and 4, in the layer 2 switch 114, the flooding occurs due to the learning omission of the MAC address a for the wired network of the terminal 110. FIG. 6 is a diagram illustrating a third example of the network in which the flooding may occur due to the MAC learning omission. In the network configuration illustrated in FIG. 6, the LAN is coupled to the WAN by a master router (Master) 120 and a backup router (Back) 121 by using a Virtual Router Redundancy Protocol (VRRP) or the like.

Regarding the downward path from the WAN to the LAN, even though the path is switched to go through the backup router 121, the upward path from the LAN to the WAN may be still selected to go through the master router 120. In this state, in the layer 2 switch 122 that does not relay between the master router 120 and the terminal (a) 123, learning omission of the MAC address a of the terminal 123 occurs in the similar way as the network illustrated in FIGS. 3 and 4. As a result, the flooding occurs in the layer 2 switch 122.

Figure 7:
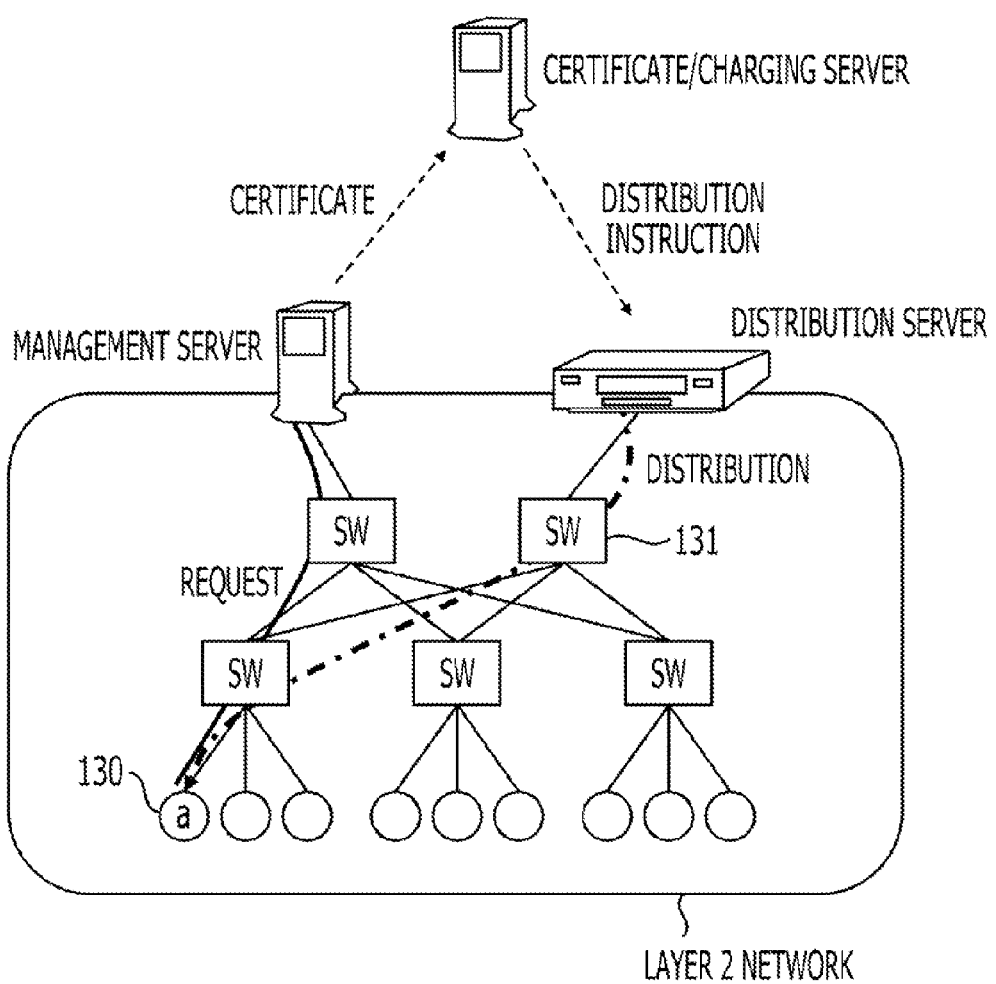
FIG. 7 is a diagram illustrating a fourth example of a network in which flooding may occur due to MAC learning omission.

FIG. 7 is a diagram illustrating a fourth example of the network in which the flooding may occur due to the MAC learning omission. According to the network configuration illustrated in FIG. 7, in the layer 2 network, the transmission destination to which the terminal (a) transmits the frame is different from the transmission source from which the frame is transmitted to the terminal 130. The configuration example is an example of movie distribution service, the transmission destination is a management server that receives a request from the terminal 130, and the transmission source from which a video is distributed is a distribution server. In this configuration, regarding the layer 2 switch 131 does not relay between the management server and the terminal 130, as illustrated in FIG. 3 and FIG. 4, the learning omission of the MAC address a of the terminal 130 occurs, so that the flooding occurs in the layer 2 switch 131.

Patent Document 1 proposes for receiving the prescribed report from another switch that stores the same address entry as the address that meets the prescribed condition and registering the address entry by which the address that meets the above-described condition is associated with the port that receives the prescribed report. However, the technique described in Patent Document 1 typically has a control frame for transmitting a prescribed report, so that processing in the switch is complicated. The flooding may continuously occur until the prescribed condition is determined to be satisfied.

The technique described in Patent Document 2 typically has a control frame for transmitting the prescribed report to a router or a LAN terminal, so that the processing in the router or the LAN terminal is complicated. The flooding may occur continuously until the address solution is performed. In the technique described in Patent Document 3, the configuration of a switching hub is complicated. Moreover, the flooding caused by the learning omission may not be resolved.

An aspect of the present application is to reduce the occurrence of the flooding.

With reference to the diagrams, embodiments of the present application will be described. The embodiments described below are simply examples and do not exclude various changes and technical application that are not described in the embodiments. It should be understood that the various changes, substitutions, and alterations may be made hereto without departing from the spirit and scope of the invention.

[1] First Embodiment (1.1) Configuration Example of Transmission Apparatus

Figure 8:
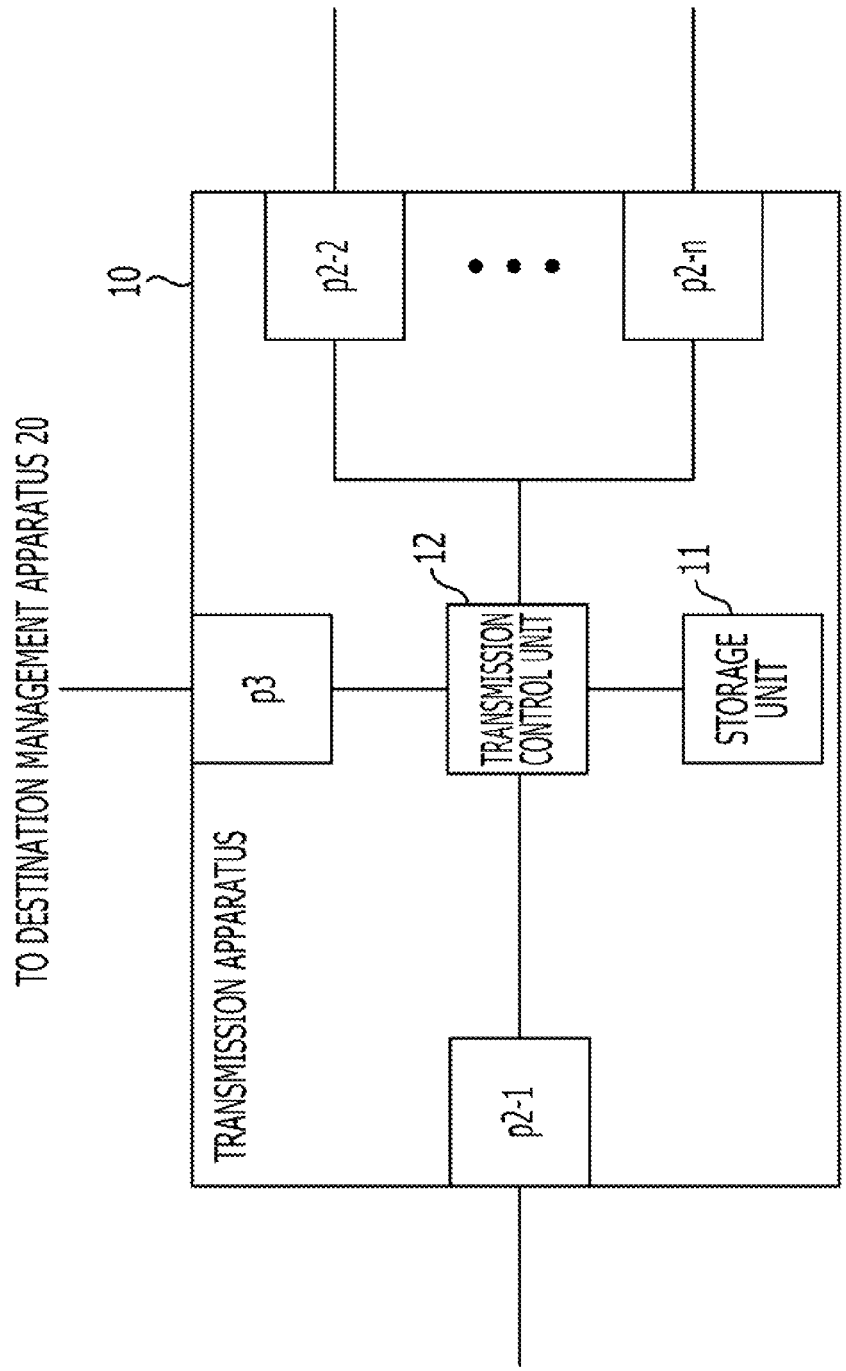
FIG. 8 is a diagram illustrating a configuration example of a transmission apparatus according to an embodiment of the present application.

FIG. 8 is a diagram illustrating an example of a configuration of a transmission apparatus according to a first embodiment of the present application.

The transmission apparatus 10 illustrated in FIG. 8 includes a function for transmitting a frame in the network. Therefore, the transmission apparatus 10 includes, for example, second ports p2-1 to p2-n (n is an integer greater than 2), a third port p3, a storage unit 11, and a transmission control unit 12. If the second ports p2-1 to p2-n are not distinguished from each other, the second ports p2-1 to p2-n may be referred to simply as the second port p2. Hereinafter, the embodiments will be described by using the MAC frame as an example of the frame. However, this does not intend that other frames except the MAC frame are not excluded.

The second ports p2-1 to p2-n are coupled to another transmission apparatus 10 in the network to transmit and receive the frame. For example, the frame received from the second port p2-1 may be transmitted to another transmission apparatus 10 by one of the second ports p2-2 to p2-n. The third port p3 is coupled to a destination management apparatus 20 described below. The third port p3 may transmit the frame received by one of the second ports p2-1 to p2-n to the destination management apparatus 20. Furthermore, the third port p3 may receive the frame transmitted from the destination management apparatus 20. Hereinafter, the third port p3 may be referred to as a default port.

The storage unit 11 stores an address entry indicating a relation between a second port p2-x (x is any of 1 to n), which receives the frame, from among the second ports p2-1 to p2-n and the transmission source address included in the frame received by the second port p2-x. For example, the MAC frame includes the MAC address of the apparatus of transmission source of the frame as a Source Address (SA) and includes the MAC address of the apparatus of transmission source of the frame as a Destination Address (DA). If the transmission source address of the frame received by the second port p2-x is the MAC address a, the storage unit 11 stores (learns) the address entry indicating the relation between the port number (a port identifier) of the second port p2-x and the MAC address a.

Figure 9:
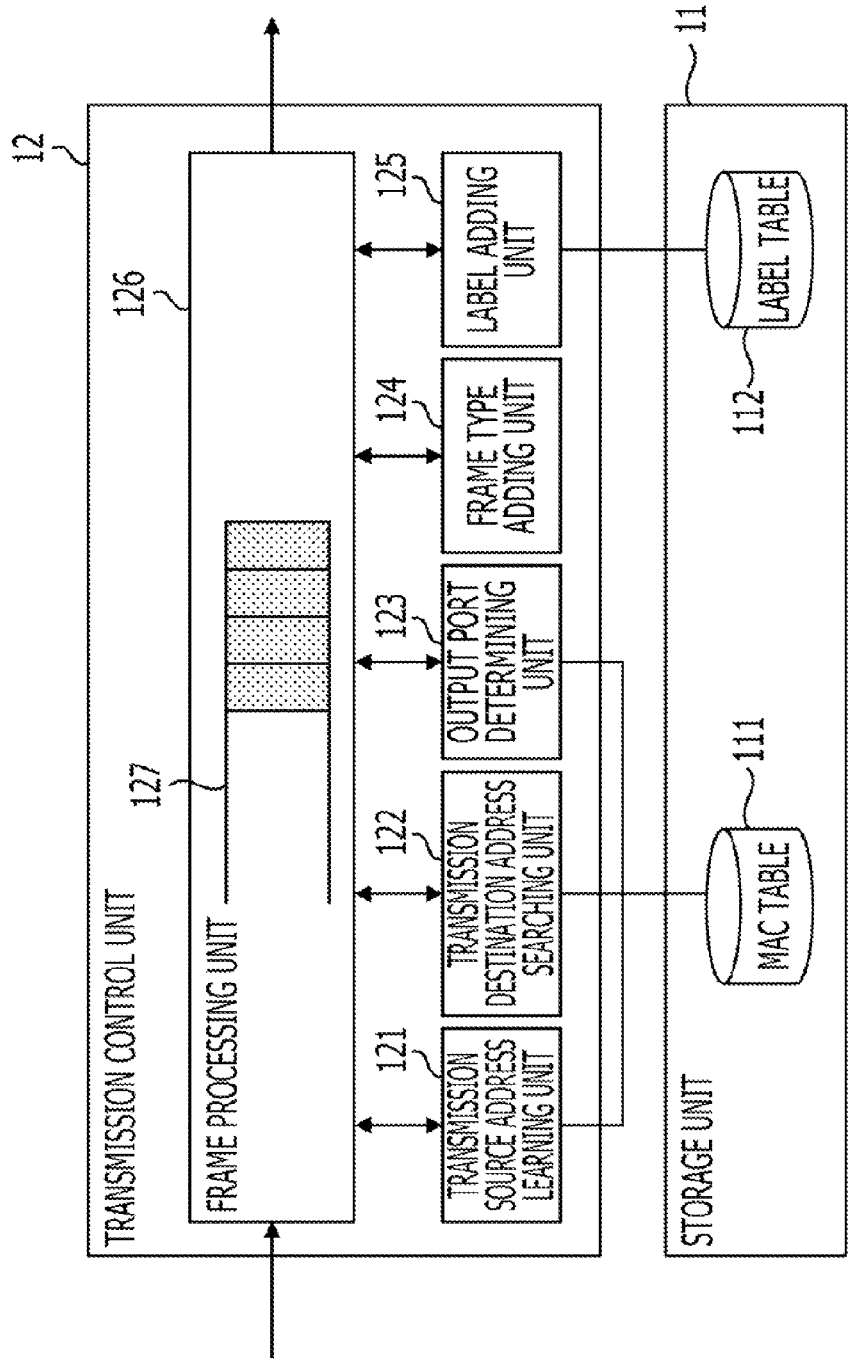
FIG. 9 is a diagram illustrating a configuration example of the transmission apparatus illustrated in FIG. 8.

Therefore, the storage unit 11 may include a MAC table 111 as illustrated in FIG. 9. As a result, according to the combination of the MAC address and the output destination port stored in the MAC table 111, the transmission apparatus 10 may determine the port from which the MAC frame to be transferred is output. The MAC table 111 indicates a port to which the frame is to be transmitted. Therefore, the MAC table 111 includes at least a MAC field that stores the transmission destination MAC address and the port identifier of the port used to transmit the MAC frame.

The combination that is stored in the MAC table 111 and has a pair of the transmission destination MAC address and the output destination port, that is, the combination of data stored in each record of the MAC table is referred to as a MAC entry. The MAC entry may be referred to as an address entry. As illustrated in FIG. 9, the storage unit 11 may include a label table 112. As a result, according to a combination of the transmission destination address and transmission source address of the transmission frame and the label stored in the label table 112, the transmission apparatus 10 may determine a label to be added to the transmission frame.

The label table 112 indicates which label is added to the transmission apparatus as the destination of the frame having the transmission destination MAC address and the transmission source MAC address. The label table 112 has at least a field for identifying a destination transmission apparatus, and a label field for storing a label to be added to the MAC frame. If the storage unit 11 does not store the address entry related to the transmission destination address included in the frame received by one of the second ports p2, that is, if the received frame is unlearned, the transmission control unit 12 transmits the corresponding frame simply to the third port p3.

In this case, if the transmission apparatus 10 receives the unlearned frame, the frame is transmitted simply to the destination management apparatus 20 coupled to the third port p3 without being subjected to the flooding processing. The destination management apparatus 20 transfers the frame to an appropriate destination. On the other hand, if the storage unit 11 stores the address entry, which is related to the transmission destination address included in the frame received by one of the second ports p2, that is, if the received frame is learned, the transmission control unit 12 transmits the frame based on the address entry.

Specifically, for example, the frame received by one of the second ports p2 is transmitted by the transmission control unit 12 to both the one of the second ports p2, which is associated with the transmission destination address included in the corresponding frame, and the third port p3. As a result, the destination management apparatus 20 coupled to the third port p3 may manage (learn) the destination of the frame received from the transmission apparatus 10. Therefore, if the transmission apparatus 10 receives the unlearned frame, the destination management apparatus 20 instead of the transmission apparatus 10 may transfer the frame to the appropriate destination.

With reference to FIG. 9, a specific configuration example of the transmission control unit 12 will be described. As illustrated in FIG. 9, the transmission control unit 12 includes, for example, a transmission source address learning unit 121, a transmission destination address searching unit 122, an output port determining unit 123, a frame type adding unit 124, a label adding unit 125, and a frame processing unit 126. The frame processing unit 126 performs various frame processing on the frame received by one of the second ports p2. Therefore, the frame processing unit 126 has, for example, a buffer 127 that temporally stores the received frame. The frame subjected to the various frame processing by the frame processing unit 126 is output to a destination that is determined by the output port determining unit 123.

The transmission source address learning unit 121 learns the transmission source address included in the frame received by one of the second ports p2 in association with the second port p2-x that received the frame. The learning result is stored as an address entry in, for example, the MAC table 111. The transmission destination address searching unit 122 searches the transmission destination address, which is included in the frame received by one of the second ports p2, from the address entry stored in the MAC table 111.

Based on the searching result from the transmission destination address searching unit 122, the output port determining unit 123 determines a port from which the frame received by one of the second ports p2 is output. Specifically, for example, if the MAC table 111 does not store the address entry related to the transmission destination address included in the frame received by one of the second ports p2, the output port determining unit 123 determines to output the frame simply to the third port p3.

On the other hand, if the MAC table 111 stores the address entry related to the transmission destination address included in the frame received by one of the second ports p2, the output port determining unit 123 determines, based on the address entry, to output the frame to the second port p2 and the third port p3 corresponding to the transmission destination address of the frame. The frame transmitted to the third port p3 functions as a frame for learning for the destination management apparatus 20.

If the frame received by one of the second ports p2 is unlearned, the frame type adding unit 124 adds a piece of first identification information (hereinafter referred to as UnKnown Unicast (UKU)), which indicates that the frame is unlearned, to the frame. Specifically, for example, the storage unit 11 does not store the address entry related to the transmission destination address included in the frame received by one of the second ports p2, the frame type adding unit 124 adds the UKU indicating that the frame is unlearned to the frame.

On the other hand, if the frame received by one of the second ports p2 is learned, the frame type adding unit 124 adds second identification information (hereinafter, referred to as Known Unicast (KU)), which indicates that the frame is learned, to the frame. Specifically, for example, if the address entry related to the transmission destination address included in the frame received by one of the second ports p2 is stored in the storage unit 11, the frame type adding unit 124 adds the KU, which indicates that the frame is learned, to the frame.

The transmission apparatus 10 may make the destination management apparatus 20 perform different processing according to the UKU or the KU added to the frame. Specifically, for example, if the destination management apparatus 20 receives the frame with the UKU, the destination management apparatus 20 may transfer the frame to the appropriate destination based on the transmission destination address included in the frame.

On the other hand, if the destination management apparatus 20 receives the frame with the KU, the destination management apparatus 20 at least learns the transmission source of the frame and may be unlikely to transfer the frame. The frame that is not transferred by the destination management apparatus 20 may be discarded. The label adding unit 125 adds a label to the frame based on the content of the label table 112.

Figure 10:
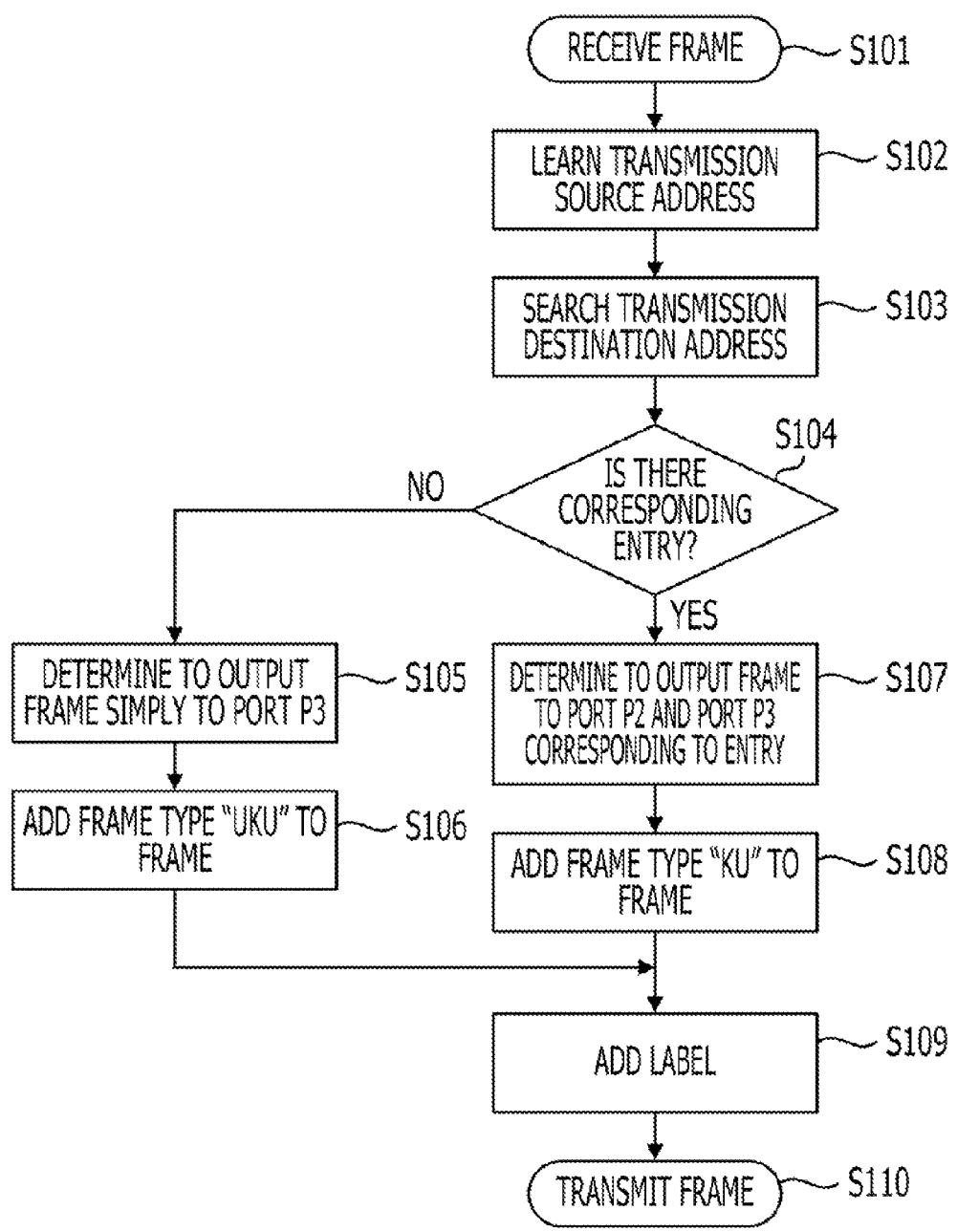
FIG. 10 is a flowchart illustrating an operation example of the transmission apparatus illustrated in FIG. 9.

The frame subjected to the various frame processing by the output port determining unit 123, the frame type adding unit 124, and the label adding unit 125 is transmitted by the frame processing unit 126 as described above to the destination determined by the output port determining unit 123. With reference to FIG. 10, an operation example of the transmission apparatus 10 will be described. If one of the second ports p2 receives the frame (Operation S101), the transmission source address learning unit 121 learns the transmission source address of the frame in association with the reception port of the frame (Operation S102). The learning result is stored in the MAC table 111.

The transmission destination address searching unit 122 searches the transmission destination address, which is included in the received frame, from the address entry included in the MAC table 111 (Operation S103) and then determines whether or not the transmission destination address is learned (Operation S104). If the transmission destination address searching unit 122 determines that the transmission destination address included in the received frame is not stored in the MAC table 111 (NO in Operation S104), the output port determining unit 123 determines to output the frame simply to the third port p3 (Operation S105).

The frame type adding unit 124 adds the frame type "UKU" to the frame (Operation S106), and the label adding unit 125 adds the label to the frame based on the content of the label table 112 (Operation S109). The frame subjected to the frame processing in Operation S105, Operation S106, and Operation S109 is transmitted to the network from the destination determined by the output port determining unit 123 (Operation S110).

On the other hand, if the transmission destination address searching unit 122 determines that the transmission destination address included in the received frame is stored in the MAC table 111 (YES in Operation S104), the output port determining unit 123 determines to output the frame to the second port p2 and the third port p3 corresponding to the transmission destination address of the frame (Operation S107). The frame type adding unit 124 adds the frame type "KU" to the frame (Operation S108), and the label adding unit 125 adds the label to the frame based on the content of the label table 112 (Operation S109).

The frame subjected to the frame processing in Operations S107 to S109 is transmitted from the destination that is determined by the output port determining unit 123 (Operation 5110). As described above, in this example, the flooding processing is not performed even if the received frame is unlearned, so that the increase of the network traffic may be suppressed. Functions of the transmission control unit 12 may be achieved by a control unit used by the transmission apparatus 10.

That is, the control unit has a unit or a function for determining whether or not the address entry, which is related to the transmission destination address included in the frame received by one of the second ports p2 of the transmission apparatus 10, is stored in the storage unit 11. Furthermore, if the control unit determines that the address entry, which is related to the transmission destination address included in the frame received by one of the second ports p2, is stored in the storage unit 11, the control unit has a unit or a function for controlling the transmission of the frame simply to the third port p3.

The function or functions of the above-described control unit may be achieved by a computer (a CPU, an information processing device, various terminals, or the like) executing a prescribed application program. That is, the above-described program is an example of the transmission control program for making a computer realize the frame transmission function of the transmission apparatus 10. The transmission control program makes the computer realize a determination function for determining whether or not the address entry related to the transmission destination address included in the frame received by one of the second ports p2 is stored in the storage unit 11 and a transmission control function for performing control so that the frame received by one of the second ports p2 is transmitted simply to the third port p3 if the determination result from the determination function indicates that the address entry related to the transmission destination address included in the frame received by one of the second ports p2.

The above-described program is recorded in a non-transitory computer readable recording medium such as, for example, a CD (CD-ROM, CD-R, CD-RW, or the like), or a DVD (DVD-ROM, DVD-RAM, DVD-R, DVD-RW, DVD+R, DVD+RW, or the like) to be provided. In this case, the computer may read out the transmission control program from the recording medium and transfers and stores the transmission control program in an internal storage device or an external storage device. The program may be recorded in a storage device (a recording device) such as, for example, a magnetic disk, an optical disk, and an optical magnetic disk and may be provided to the computer from the storage device through a communication line.

The computer may include hardware and an Operating System (OS) and, the hardware operates under control of the OS. When the hardware is operated by the application program alone without the OS, the hardware is equivalent to the computer. The hardware includes at least a micro processor such as a CPU and a unit for reading a computer program recorded in the recording medium.

The application program as the above-described transmission control program includes a program code that makes the computer realize the function as the transmission control unit 12. Part of the function may be achieved by the OS instead of the application program. In addition to the flexible disk, CD, DVD, magnetic disk, optical disk, and optical magnetic disk, various non-transitory computer readable mediums such as an IC card, a ROM cartridge, a magnetic tape, a punch card, an internal storage device of a computer (a memory such as a RAM or a ROM), an external storage device of a computer, a print material with a code such as a bar-code may be used as the above-described recording medium.

Figure 33:
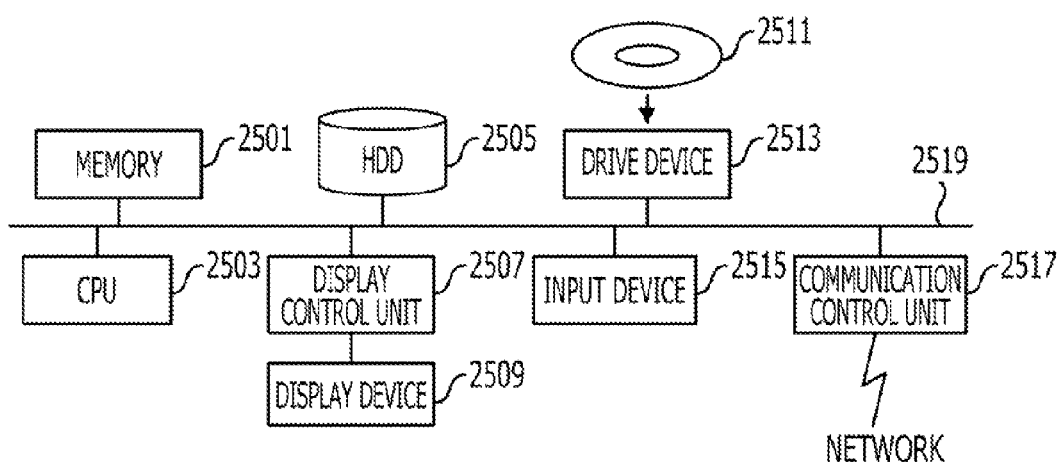
FIG. 33 is a diagram illustrating an example of the hardware of the computer.

FIG. 33 is a diagram illustrating an example of the hardware of the computer. The transmission control unit 12 in FIG. 9 corresponds to CPU 2503 and/or communication control unit 2517 in FIG. 33. The storage unit 11 in FIG. 9 corresponds to memory 2501 and/or HDD 2505 in FIG. 33. The computer readable recording medium in paragraph [009] corresponds to disk media 2511, which is readable with the drive device 2513 in FIG. 33.

(1.2) Configuration Example of Destination Management Apparatus

Figure 11:
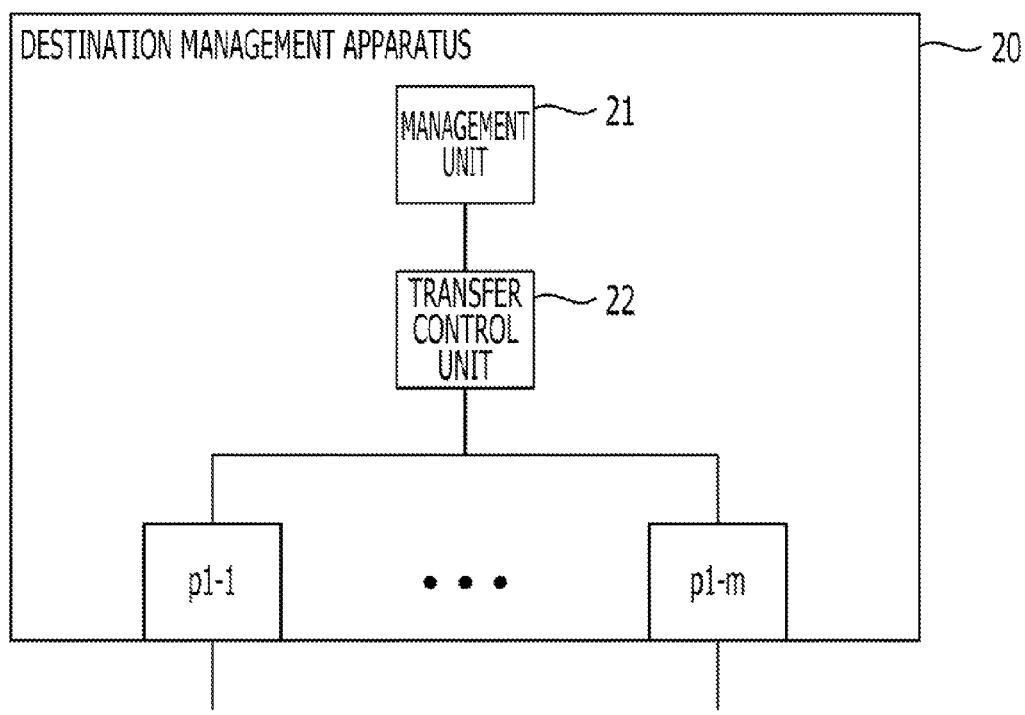
FIG. 11 is a diagram illustrating a configuration example of a destination management apparatus according to an embodiment of the present application.

FIG. 11 is a diagram illustrating an example of a configuration of a destination management apparatus according to an embodiment of the present application. The destination management apparatus 20 illustrated in FIG. 11 has a function for transmitting and receiving a frame while being coupled to the transmission apparatus 10. Therefore, the destination management apparatus 20 includes, for example, first ports p1-1 to p1-m, a management unit 21, and a transfer control unit 22. Hereinafter, if the first ports p1-1 to p1-m are not distinguished from each other, the first ports p1-1 to p1-m may be referred to simply as a first port p1.

Each of the first ports p1-1 to p1-m is coupled to the transmission apparatus 10 and transmits and receives the frame to and from the transmission apparatuses, respectively. For example, the frame received by the first port p1-1 may be transferred to an appropriate destination by one of the first ports p1-1 to p1-m. The management unit 21 manages the address entry indicating the relation between a first port p1-y (y is one of 1 to m), which receives the frame, from among the first ports p1-1 to p1-m, and the transmission source address included in the frame received by the first port p1-y.

Figure 12:
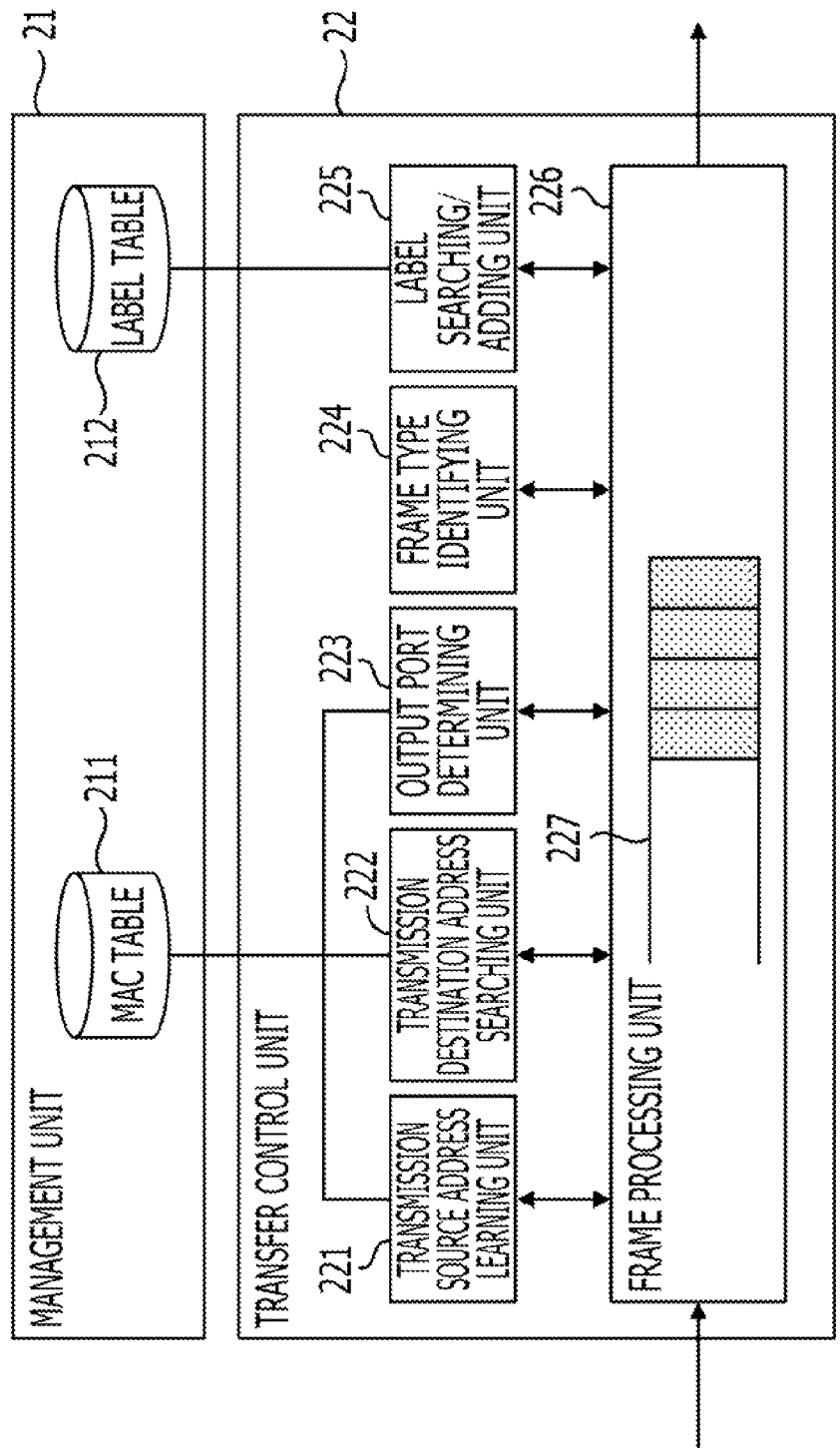
FIG. 12 is a diagram illustrating a configuration example of the destination management apparatus illustrated in FIG. 11.

For example, if the transmission source address of the frame received by the first port p1-y is the MAC address b, the management unit 21 stores (learns) the address entry indicating the relation between the port identifier y of the first port p1-y and the MAC address b. Accordingly, as illustrated in FIG. 12, the management unit 21 may have a MAC table 211. As a result, the destination management apparatus 20 may determine the port from which the MAC frame to be transferred is output according to the combination of the MAC address stored in the MAC table 211 and the output destination port.

As illustrated in FIG. 12, the management unit 21 may include a label table 212. According to the combination of the transmission destination address and the transmission source address and the label stored in the label table 212, the destination management apparatus 20 may determine the label that is to be added to the transfer frame. The transmission destination address and the transmission source address may be other identifiers indicating the transmission apparatus of the transmission destination and the transmission apparatus of the transmission source, respectively.

The transfer control unit 22 identifies the frame type added to the frame received by one of the first ports p1 and searches whether or not the address entry related to the transmission destination address included in the frame is stored in the management unit 21. If the frame type added to the frame received by one of the first ports p1 is the UKK and if the address entry related to the transmission destination address included in the frame is stored in the management unit 21, the transfer control unit 22 transfers the frame based on the address entry stored in the management unit 21.

Specifically, the frame received by one of the first ports p1 is transmitted to one of the first ports p1, which is associated with the transmission destination address included in the frame by the address entry stored in the management unit 21. Furthermore, if the frame type added to the frame received by one of the first ports p1 is the KU and if the address entry related to the transmission destination address included in the frame is not stored in the management unit 21, the transfer control unit 22 determines that the frame is a learning frame, learns the transmission source address of the frame in association with the first port p1 by which the frame is received, and stores a learning result in the management unit 21. After the frame learning, the frame is unlikely to be transferred.

The frame may be discarded, for example.

If the frame type added to the frame received by one of the first ports p1 is the KU and if the address entry related to the transmission destination address included in the frame is not stored in the management unit 21, the transfer control unit 22 is unlikely to transfer the frame. The transfer control unit 22 may discard the frame, for example. If the frame type added to the frame received by one of the first ports p1 is the UKU and if the address entry related to the transmission destination address included in the frame is not stored in the management unit 21, the transfer control unit 22 may perform the flooding processing on the frame. Specifically, for example, the frame may be transmitted to all the first ports p1 except the reception port.

That is, if the UKU is added to the frame received by one of the first ports p1 and if the address entry related to the transmission destination address included in the frame is not managed by the management unit 21, the transfer control unit 22 has a function for performing the flooding processing on the frame. A specific configuration example of the transfer control unit 22 will be described with reference to FIG. 12.

As illustrated in FIG. 12, a transfer control unit 12 includes a transmission source address learning unit 221, a transmission destination address searching unit 222, an output port determining unit 223, a frame type identifying unit 224, a label searching/adding unit 225, and a frame processing unit 226. The frame processing unit 226 performs various frame processing on the frame received by one of the first ports p1. Accordingly, the frame processing unit 226 has, for example, a buffer 227 that temporally stores the received frame. The frame subjected to the various frame processing by the frame processing unit 226 is output to the destination determined by the output port determining unit 223.

The transmission source address learning unit 221 learns the transmission source address included in the frame received by one of the first ports p1 in association with the first port p1-y that receives the frame. The learning result is stored as an address entry in the MAC table 211, for example. The transmission destination address searching unit 222 searches the transmission destination address, which is included in the frame received by one of the first ports p1, from the address entry stored in the MAC table 211.

The frame type identifying unit 224 identifies the frame type added to the frame received by one of the first ports p1. Specifically, the frame type identifying unit 224 identifies whether the frame type added to the frame received by one of the first ports p1 is the UKU or the KU. Based on a research result from the transmission destination address searching unit 222 and an identification result from the frame type identifying unit 224, the output port determining unit 223 determines the port from which the frame received by one of the first ports p1 is output.

For example, if the frame type of the received frame is the UKU and if the transmission destination address included in the frame is searched from the management unit 21, the output port determining unit 223 determines to transmit the frame to the first port p1 associated with the transmission destination address, which is included in the frame, by the address entry stored in the management unit 21. If the frame type of the received frame is identified to be the KU and if the transmission destination address included in the frame is not searched from the management unit 21, the output port determining unit 223 determines to discard the frame without transferring the frame after the address learning by the transmission source address learning unit 221.

If the frame type of the received frame is identified to be the KU and if the transmission destination address included in the frame is searched from the management unit 21, the output port determining unit 223 determines to discard the frame without transferring the frame, for example. If the frame type of the received frame is identified to be the UKU and if the transmission destination address included in the frame is not searched from the management unit 21, the output port determining unit 223 determines to transmit the frame to all the first ports p1 other than the reception port.

Based on the transmission source address (the identifier indicating the transmission apparatus of the transmission source) and the transmission destination address (the identifier indicating the transmission apparatus of the transmission destination) included in the received frame, the label searching/adding unit 225 searches the label to be added to the frame from the label table 212 and adds the searched label to the frame. As described above, the frame subjected to the various frame processing by the output port determining unit 223 and the label searching/adding unit 225 is output by the frame processing unit 226 to the destination determined by the output port determining unit 223.

Figure 13:
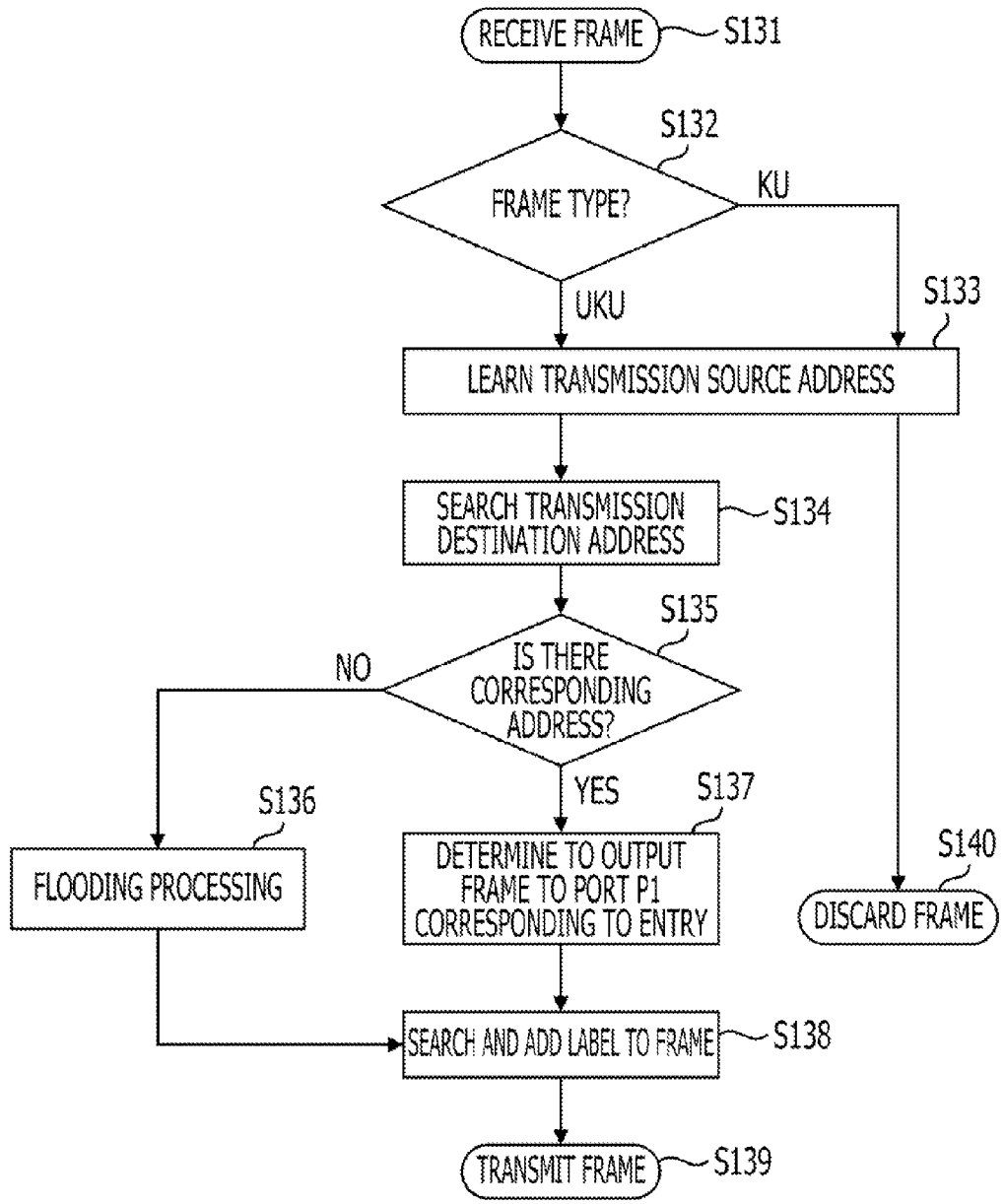
FIG. 13 is a flowchart illustrating an operation example of the destination management apparatus illustrated in FIG. 12.

An operation example of the destination management apparatus 20 will be described with reference to FIG. 13. If one of the first ports p1 receives the frame (Operation S131), the frame type identifying unit 224 identifies the frame type added to the frame (Operation S132). If the frame type identifying unit 224 identifies the frame type to be the KU (KU route in Operation S132), the transmission source address learning unit 221 learns the transmission source address of the frame in association with the reception port of the frame (Operation S133). The learning result is stored in the MAC table 211.

After the frame is learned by the transmission source address learning unit 221, the output port determining unit 223 discards the frame without transferring the frame, for example (Operation S140). On the other hand, if the frame type identifying unit 224 identifies the frame type to be the UKU (UKU route in Operation S132), the transmission source address learning unit 221 learns the transmission source address of the frame in association with the reception port of the frame (Operation S133). The learning result is stored in the MAC table 211.

The transmission destination address searching unit 222 searches the transmission destination address included in the received frame from the address entry stored in the MAC table 211 (Operation S134) and then determines whether or not the transmission destination address is learned (Operation S135). If the transmission destination address searching unit 222 determines that the transmission destination address included in the received frame is not stored in the MAC table 211 (NO in Operation S135), the output port determining unit 223 determines to output (the flooding processing) the frame to all the first ports p1 except the reception port (Operation S136).

Based on the transmission source address and the transmission destination address of the frame, the label adding unit 125 searches the label to be added to the frame from the label table 212 and adds the searched label to the frame (Operation S138). The frame subjected to the frame processing in Operation S138 is transmitted from the destination determined by the output port determining unit 223 to the network (Operation S139).

If the transmission destination address searching unit 222 determines that the transmission destination address included in the received frame is stored in the MAC table 211 (YES in Operation S135), the output port determining unit 223 determines to output the frame to the first port p1 corresponding to the transmission destination address of the frame (Operation S137). Based on the transmission source address and the transmission destination address of the frame, the label adding unit 125 searches the label to be added to the frame from the label table 212 and then adds the searched label to the frame (Operation S138).

The frame subjected to the frame processing in Operation S137 and Operation S138 is transmitted from the destination determined by the output port determining unit 223 to the network (Operation S139). As described above, the destination management apparatus 20 transfers the frame received from the transmission apparatus 10 to the appropriate destination. Thus, the frame transfer may be surely performed while the flooding processing is suppressed.

(1.3) Configuration Example of Transmission System

Figure 14:
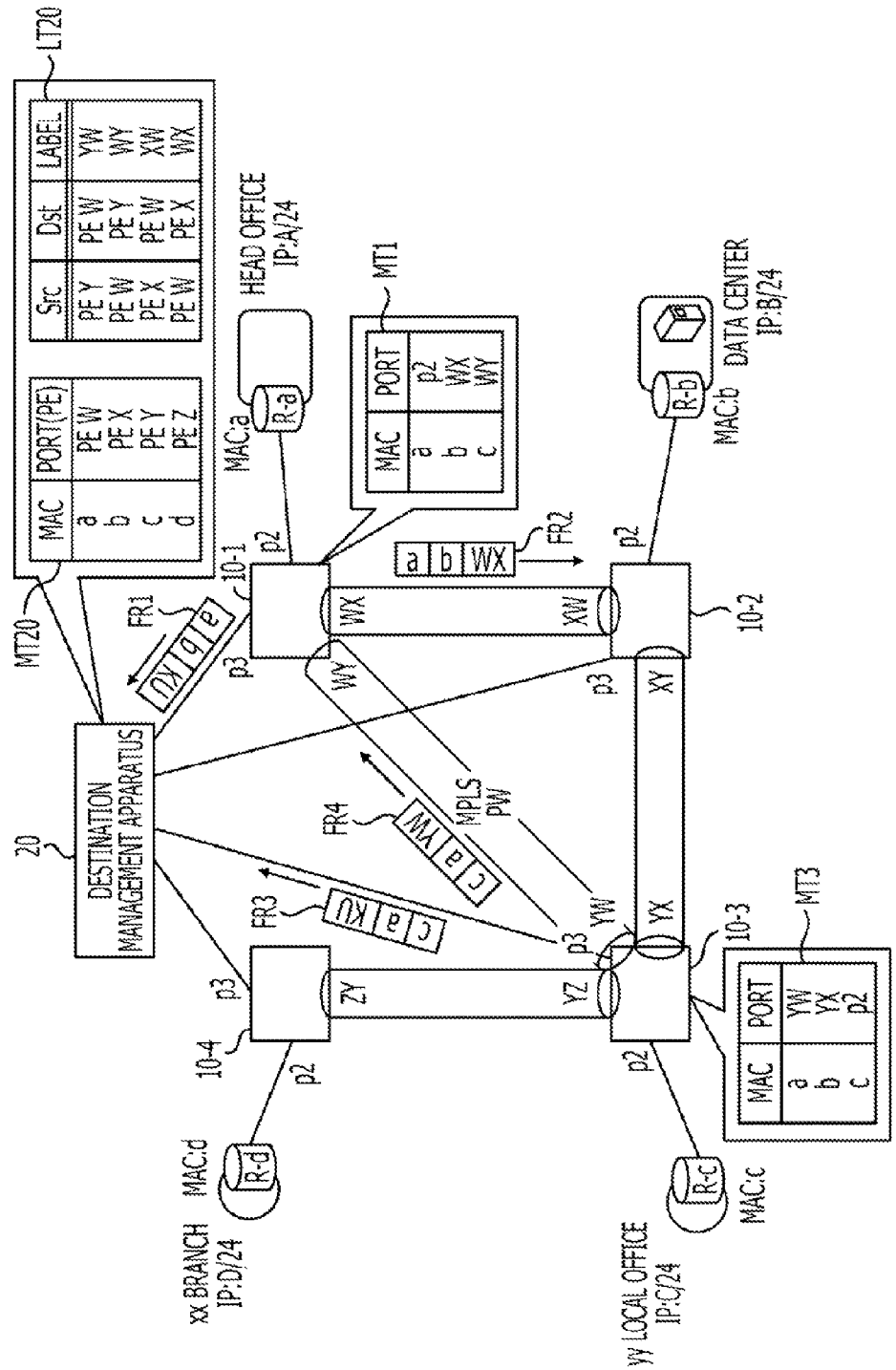
FIG. 14 is a diagram illustrating a configuration example of a transmission system according to an embodiment of the present application.

FIG. 14 is a diagram illustrating an example of a configuration of a transmission system according to an embodiment of the present application. The network that includes the transmission system illustrated in FIG. 14 is configured as a wide-area LAN in which the head office of a company, a data center, xx branch, and a yy local office are coupled with each other. In the example illustrated in FIG. 14, edge routers (hereinafter, referred to as a Provider Edge (PE)) are mutually coupled with each other by a Label Switched Path (LSP) using a Multi Protocol Label Switching-Pseudo Wire (MPLS-PW) provided by a Virtual Private LAN Service (VPLS).

The transmission system illustrated in FIG. 14 includes, for example, the destination management apparatus (address resolution apparatus) 20, which manages the destination of the frame, and the plurality of PEs 10-1 to 10-4 that switch the frame in the wide-area LAN. The PEs 10-1 to 10-4 function as an example of the transmission apparatus 10. If the PEs 10-1 to 10-4 are not distinguished from each other, the PEs 10-1 to 10-4 are referred to simply as the PE 10. The number of the PEs 10 is not limited to the number illustrated in FIG. 14. Hereinafter, the PE 10-1, 10-2, 10-3, and 10-4 may be referred to as PE W, PE X, PE Y, and PE Z, respectively.

In the transmission system illustrated in FIG. 14, the LAN in the head office has a network address A/24 and is coupled to the wide-area LAN through the router R-a coupled to the PE 10-1. The MAC address of the router R-a is a. The LAN in the data center has a network address B/24 and is coupled to the wide-area LAN through the router R-b coupled to the PE 10-2. The MAC address of the router R-b is b.

The LAN in the yy local office has a network address C/24 and is coupled to the wide-area LAN through the router R-c coupled to the PE 10-3. The MAC address of the router R-c is c. The LAN in the xx branch has a network address D/24 and is coupled to the wide-area LAN through the router R-d coupled to the PE 10-4. The MAC address of the router R-d is d.

The port p2 of the PE 10-1 coupled to the LAN in the head office is coupled to the router R-a. The port WX of the PE 10-1 is coupled to the PE 10-2. The port WY of the PE 10-1 is coupled to the PE 10-3. The port p3 of the PE 10-1 is coupled to the port p1-1 of the destination management apparatus 20. The port p2 of the PE 10-2 coupled to the LAN in the data center is coupled to the router R-b. The port XW of the PE 10-2 is coupled to the PE 10-1. The port XY of the PE 10-2 is coupled to the PE 10-3. The port p3 of the PE 10-2 is coupled to the port p1-2 of the destination management apparatus 20.

The port p2 of the PE 10-3 coupled to the LAN in the yy local office is coupled to the router R-c. The port YX of the PE 10-3 is coupled to the PE 10-2. The port YW of the PE 10-3 is coupled to the PE 10-1. The port YZ of the PE 10-3 is coupled to the PE 10-4. The port p3 of the PE 10-3 is coupled to the port p1-3 of the destination management apparatus 20.

The port p2 of the PE 10-4 coupled to the LAN in the xx branch is coupled to the router R-d. The port ZY of the PE 10-4 is coupled to the PE 10-3. The port p3 of the PE 10-4 is coupled to the port p1-4 of the destination management apparatus 20. As described above, the port p2 of the PE 10-1, the WY and WX, the port p2 of the PE 10-2, the XW and XY, the port p2 of the PE 10-3, the YW, YX, and YZ, the port p2 of the PE 10-4, and the ZY correspond to the second port p2 of the transmission apparatus 10 illustrated in FIG. 8. The port p3 of each of the PEs 10 is equivalent to the third port p3 of the transmission apparatus 10 illustrated in FIG. 8. The ports p1-1 to p1-4 of the destination management apparatus 20 are equivalent to the first port b. The PEs 10-1 to 10-4 are coupled with each other by full mesh by the MPLS PW. In the example illustrated in FIG. 14, the diagrams of the PW between the PE 10-1 and the PE 10-4 and between 10-2 and the PE 10-4 are omitted.

Reference numerals MT1, MT3, and MT20 indicate MAC tables used by the PE 10-1, the PE 10-3, and destination management apparatus 20 for frame forwarding. The MAC tables MT1, MT3, and MT20 indicate which port to be used to output the MAC frame having the MAC address as the transmission destination address. In this case, in the VPLS, for example, the MPLS PW that is subjected to signaling in advance is considered as a logical port.

Therefore, in the example illustrated in FIG. 14, the MAC table MT1 of the PE 10-1 includes a combination of the MAC address a of the router R-a and the port p2 of the PE 10-1, a combination of the MAC address of the router R-b and the port WX of the PE 10-1, and a combination of the MAC address of the router R-c and the port WY of the PE 10-1.

The MAC table MT3 of the PE 10-3 includes a combination of the MAC address a of the router R-a and the port YW of the PE 10-3, a combination of th MAC address b of the router R-b and the port YX of the PE 10-3, and a combination of the MAC address c of the router R-c and the port p2 of the PE 10-3. The MAC table MT20 of the destination management apparatus 20 has a combination of the MAC address a of the router R-a and the port p1-1 (indicated as the PE W as a coupling destination of the port p1-1 in FIG. 14), a combination of the MAC address b of the router R-b and the port p1-2

(indicated as the PE X as a coupling destination of the port p1-2 in FIG. 14), a combination of the MAC address c of the router R-c of the port p1-3 (indicated as the PE Y as a coupling destination of the port p1-3), and a combination of the MAC address d of the router R-d and the port p1-4 (indicated as the PE Z as a coupling destination of the port p1-4).

The reference numeral LT20 indicates a label table that is used to add a label by the destination management apparatus 20. The label table LT20 indicates how to add the label information indicating the transmission source of the frame and the transmission destination of the frame. In this case, for example, signaling is performed so that the MAC frame is transferred between the PE W and the PE X, the frame transferred from the PE W to the PE X is added with a label XW, and the frame that is transferred from the PE X to the PE W is added with the label XW. At this time, when the PE X receives the MAC frame, which has the transmission source address a and is added with the label WX, the PE X adds the label XW to the MAC frame and then transmits the MAC frame having the transmission destination address a. Therefore, for example, the PE 10-1, which receives the frame added with the label XW from the destination management apparatus 20, may learn the transmission source address included in the frame in association with the port WX coupled to the PE-W.

In addition to the destination management apparatus 20, each of the PEs 10 may have the label table. According to the above-described rule, the frame transmitted from the each of the PEs 10 is added with prescribed label information.

(1.4) Operation Example

In the network illustrated in FIG. 14, there is a case, for example, where a packet is transmitted from a terminal of the LAN in the head office to the terminal of the LAN in the data center.

At this time, since the PE 10-1 stores the address entry related to the transmission destination address b (that is, the PE 10-1 learns the transmission destination address b), the PE 10-1 adds the label WX to the frame having the transmission source address a and the transmission destination address b and then transfers the frame to the PE 10-2. Furthermore, the PE 10-1 in this example duplicates the frame received from the router R-a and then transmits the duplicated frame FR1 to the destination management apparatus 20 through the port p3. The frame FR1 to be transmitted to the destination management apparatus 20 may be added with the KU indicating that the frame FR1 is learned by the PE 10-1. The identification information such as the KU or the UKU may be set to the optical area that is called a Control Word (CW) included in the frame, for example. Specifically, a Reserved area included in the CW may be used as an area for frame identification. For example, the frame in which 1 is set to the area may be used as a frame added with the KU, and the frame in which 2 is set to the area may be used as a frame added with the UKU. A usage example of the CW will be described in [7].

If the destination management apparatus 20 receives the frame FR1 added with the KU from the PE 10-1, the destination management apparatus 20 learns (stores) the transmission source address a of the frame FR1 in association with the received port p1-1 of the frame FR1. Accordingly, the destination management apparatus 20 may generate and manage the MAC table MT20 that indicates which port p1 to which the received frame is transferred. Furthermore, the destination management apparatus 20 may generate and manage the label table LT20 that indicates which label the frame is added to the frame.

If the destination management apparatus 20 receives the frame FR1 added with the KU, the destination management apparatus 20 may discard the frame FR1 without transferring the frame FR1. This is because the frame added with the KU is simply a frame for learning the destination, and the frame of the duplication source is transmitted from one of the PEs 10 to an appropriate destination. For example, the similar transfer is performed when a packet is transmitted from the terminal of the LAN in the yy local office to the terminal of the LAN in the head office. That is, the transferring processing is performed on the frame FR3 and the frame FR4 in the similar way.

Figure 15:
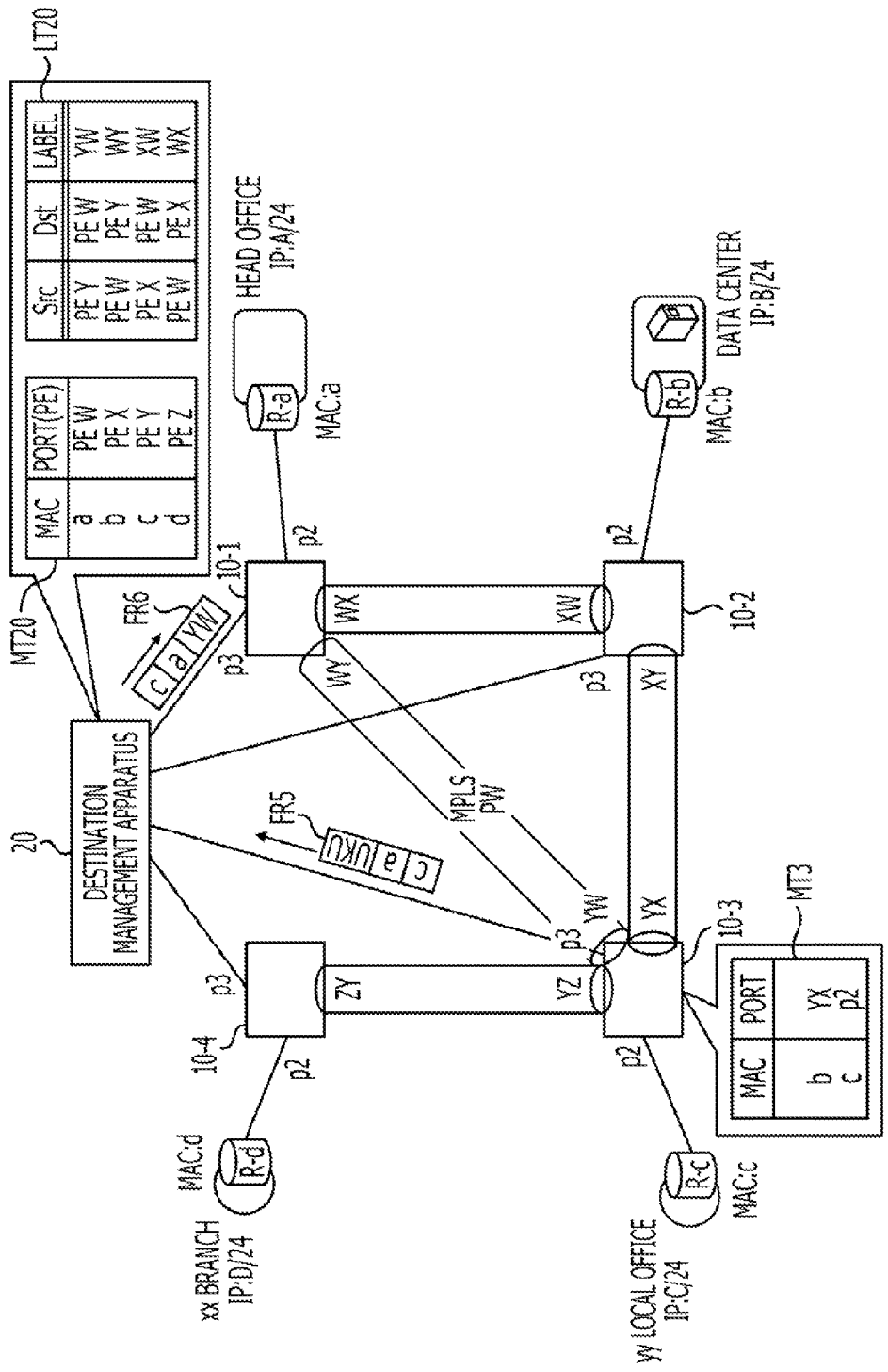
FIG. 15 is a diagram illustrating a transmission example of a frame of MAC unlearning in the transmission system illustrated in FIG. 14.

In general, the aging (deleting) is performed on the address entry stored in the MAC table of the PE 10 for approximately 5 minutes, so that the address entry related to the MAC address a from the MAC table MT3 of the PE 10-3 may be subjected to the aging. While the address entry related to the MAC address a is deleted from the MAC table MT3 of the PE 10-3, the address entry related to the MAC address a is stored in the MAC table MT20 of the destination management apparatus 20 as illustrated in FIG. 15.

Figure 16:
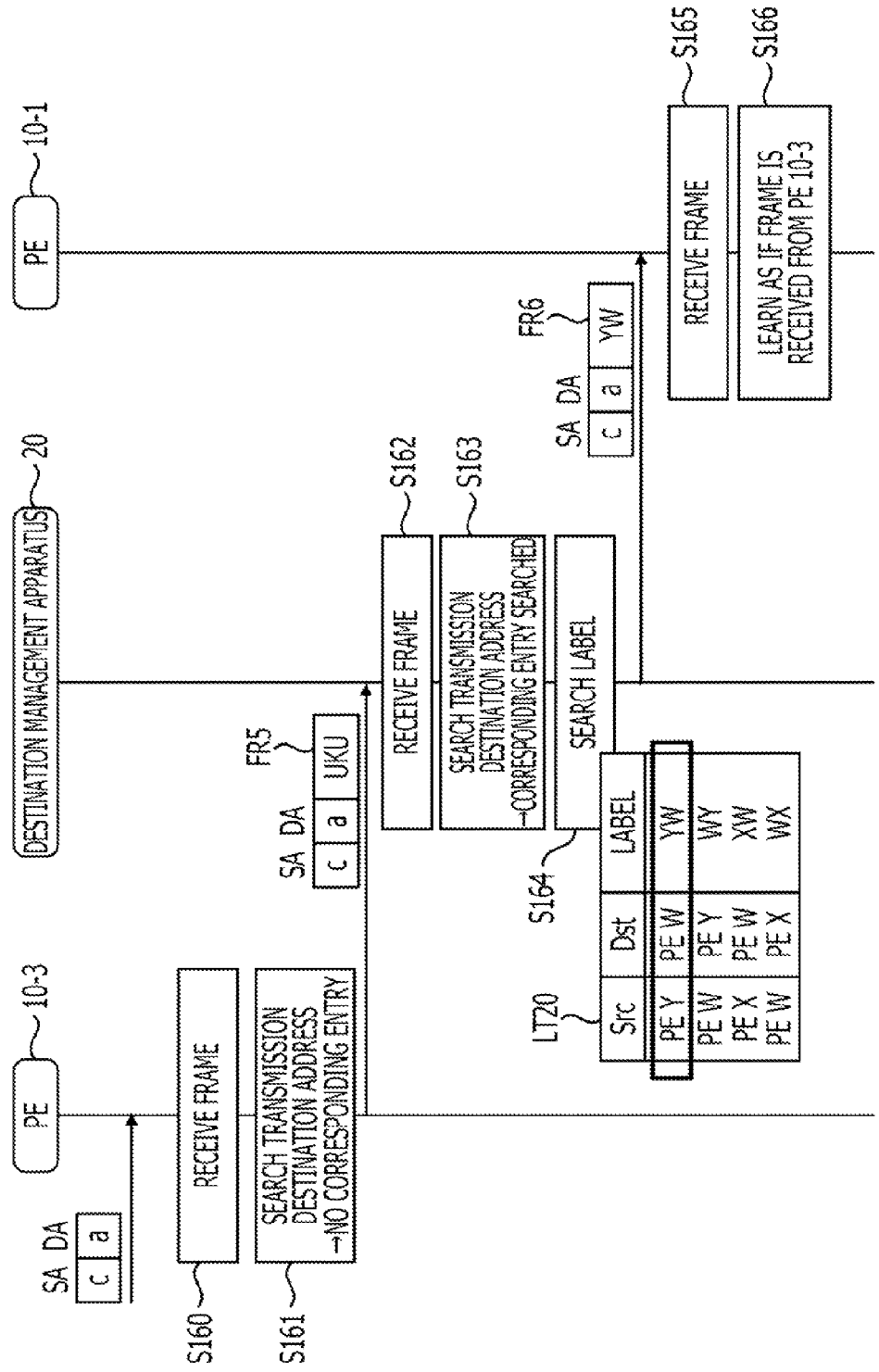
FIG. 16 is a flowchart illustrating an operation example of the transmission system illustrated in FIG. 14.

The PE 10-3 receives the frame that has the transmission source address c and the transmission destination address a from the router R-c (Operation S160 in FIG. 16). The PE 10-3 searches (determines) whether or not the address entry related to the transmission destination address a included in the received frame is stored in the storage unit 11. Since the storage unit 11 of the PE 10-3 does not store the address entry related to the transmission destination address a (Operation S161 in FIG. 16), the storage unit 11 of the PE 10-3 adds the UKU to the frame FR5 that has the transmission source address c and the transmission destination address a and then transmits the frame FR5 simply to the destination management apparatus 20.

If the destination management apparatus 20 receives the frame FR5 added with the UKU from the PE 10-3 (Operation S162 in FIG. 16), the destination management apparatus 20 searches (determines) whether or not the address entry related to the transmission address a included in the received frame is not stored in the management unit 21. At this time, since the management unit 21 stores the address entry related to the transmission destination address a (Operation S163 in FIG. 16), the management unit 21 determines to transfer the frame FR5 to the PE 10-1 based on the address entry related to the MAC address a stored in the MAC table MT20. At this time, based on the transmission source address and the transmission destination address of the received frame, the destination management apparatus 20 searches the label to be added to the frame from the label table LT20 (Operation S164 in FIG. 16). In this example, the label YW is searched and is then added to the frame FR6, and the frame FR6 is transferred to the PE 10-1. The destination management apparatus 20 may generate (recognize) the label table based on the information collected from the PEs 10 using the SNMP or the like.

If the PE 10-1 receives the frame FR6 added with the label YW from the destination management apparatus 20 (Operation S165 in FIG. 16), the PE 10-1 may learn the transmission source address c included in the frame in association with the label YW. That is, the PE 10-a may learn as if the frame FR6 is transmitted from the PE 10-3 (Operation S166 in FIG. 16).

That is, the third port p3 of this example has a function for receiving, from the destination management apparatus 20, the frame with the label having the label information indicating at least the transmission source of the frame. The storage unit 11 of this example has a function for storing the address entry indicating a relation between the transmission source address included in the frame with the label received by the third port p3 and the second port p2, which is coupled to the transmission source of the frame indicated by the label information, from among the second ports p2.

If the frame FR6 related to the label WY is learned, the PE 10-1 may clear (initialize) the aging timer of the MAC table. In this case, the aging timer that measures an elapsed time from reception of each frame in each transmission source address. If the frame is not received in a prescribed period, the aging timer is a timer as a trigger of the aging processing for deleting the address entry related to the transmission source address of the frame.

According to this example, even if the PE 10 receives the unlearned frame, the frame is transmitted simply to the destination management apparatus 20, so that the flooding processing may be suppressed. As a result, the traffic of the network may be decreased.

[2] First Deformation Example

FIGS. 15 and 16 illustrate examples in which the unlearned frame FR5 with the transmission destination address a is transmitted simply to the destination management apparatus 20.

Figure 17:
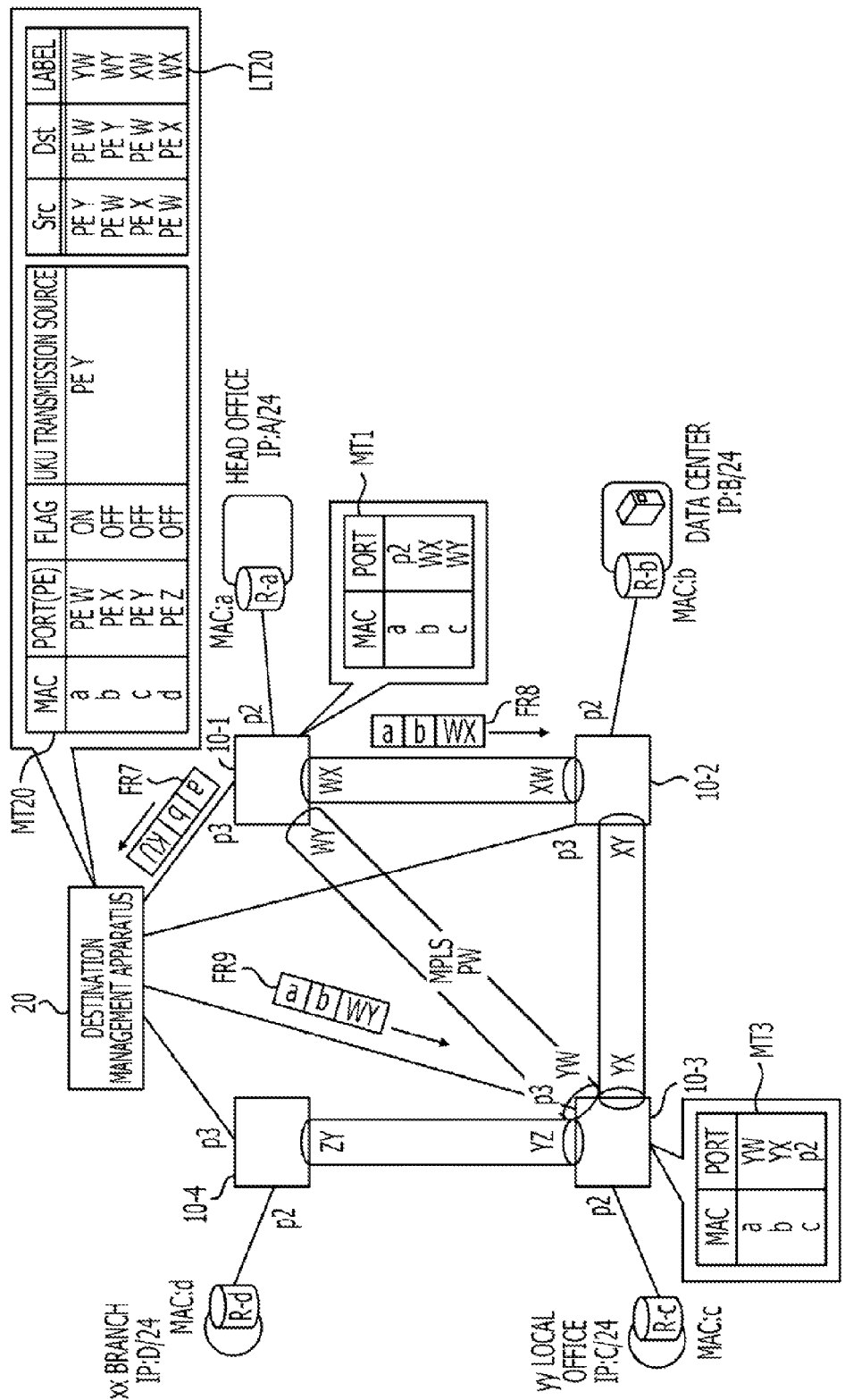
FIG. 17 is a diagram illustrating a configuration example of a transmission system according to the first embodiment of the present application.

In this case, the PE 10-3 is in a state (learning omission).where the frame FR5 having the transmission destination address a is unlearned. Accordingly, the frame FR5 is transmitted through the destination management apparatus 20 most of the time if not always. As a result, transmission delay may occur, or load of the transferring processing by the destination management apparatus 20 may increase. In this example, as illustrated in FIG. 17, the destination management apparatus 20 stores the reception of the frame added with the UKU. Specifically, for example, if the destination management apparatus 20 receives the frame added with the UKU from the PE 10-3, a flag (a UKU flag) indicating that the frame added with the UKU is received is set to be turned on, and the information related to the transmission source of the frame is stored in the MAC table MT20 (Operation S191 in FIG. 18).

Figure 18:
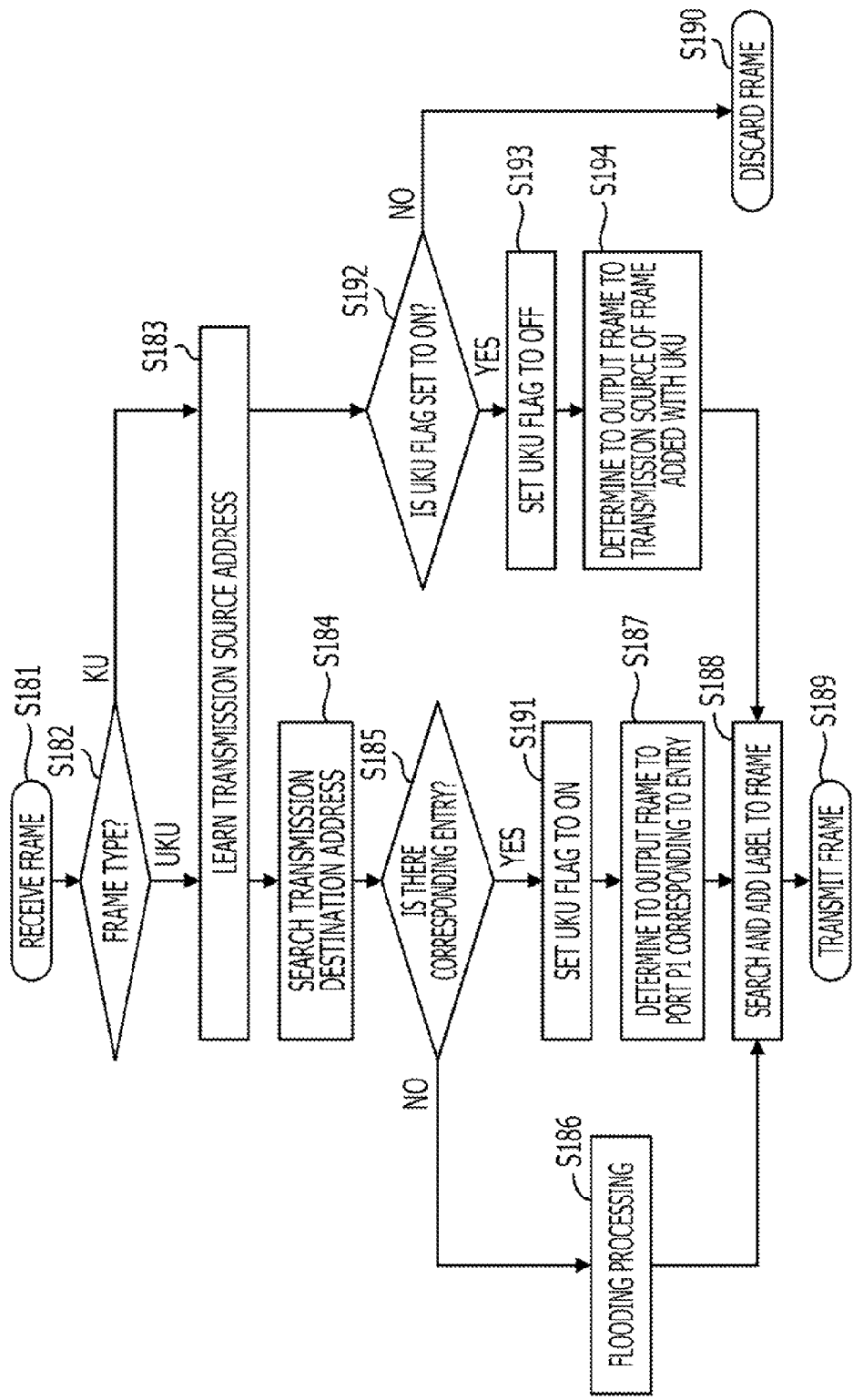
FIG. 18 is a flowchart illustrating an operation example of the destination management apparatus illustrated in FIG. 17.

The destination management apparatus 20 determines whether the UKU flag, which is related to the transmission source address of the received frame added with the KU, is turned on or not (Operation S192 in FIG. 18). If the UKU flag is not turned on (NO in Operation S192 in FIG. 18), the frame may be discarded without being transferred (Operation S190 in FIG. 18).

On the other hand, if the frame FR7 with the transmission source address a of which the UKU flag is turned on is received from another PE 10 (the PE 10-1 in the example in FIG. 17) (YES in Operation S192 in FIG. 18), the UKU flag is set to be turned off (Operation S193 in FIG. 18). The destination management apparatus 20 transfers the frame FR7 as a learning frame FR9 to the PE 10-3 as the transmission source associated with the UKU flag without discarding the frame FR7. The frame FR7 is a duplicated frame of the frame FR8. The frame FR8 is transmitted by the PE 10-1 to the PE 10-2 as the appropriate destination. In FIG. 18, Operations S181 to S190 indicate processing equivalent to Operations S131 to S140 illustrated in FIG. 13.

An operation example of the transmission system illustrated in FIG. 17 will be described with reference to FIGS. 19 and 20. The PE 10-3 receives the frame with the transmission source address c and the transmission destination address a from the router R-c (Operation S195 in FIG. 19). The PE 10-3 searches (determines) whether or not the address entry related to the transmission destination address a included in the received frame is stored in the storage unit 11. Since the storage unit 11 of the PE 10-3 does not store the address entry related to the transmission destination address a (Operation S196 in FIG. 19), the storage unit 11 adds the UKU to the frame FR5 having the transmission source address c and the transmission destination address a and then transmits the UKU simply to the destination management apparatus 20.

If the destination management apparatus 20 receives the frame FR5 added with the UKU by the PE 10-3 (Operation S197 in FIG. 19), the destination management apparatus 20 searches (determines) whether or not the address entry related to the transmission destination address a included in the received frame is not stored in the management unit 21. Since the management unit 21 stores the address entry related to the transmission destination address a (Operation S198 in FIG. 19), the management unit 21 determines to transfer the frame FR5 to the PE 10-1 based on the address entry related to the MAC address a having the MAC table MT20. The destination management apparatus 20 sets the UKU flag, which indicates that the frame added with the UKU is received, to ON and stores the information (UKU transmission source) related to the transmission source of the frame (Operation S199 in FIG. 19).

Figure 19:
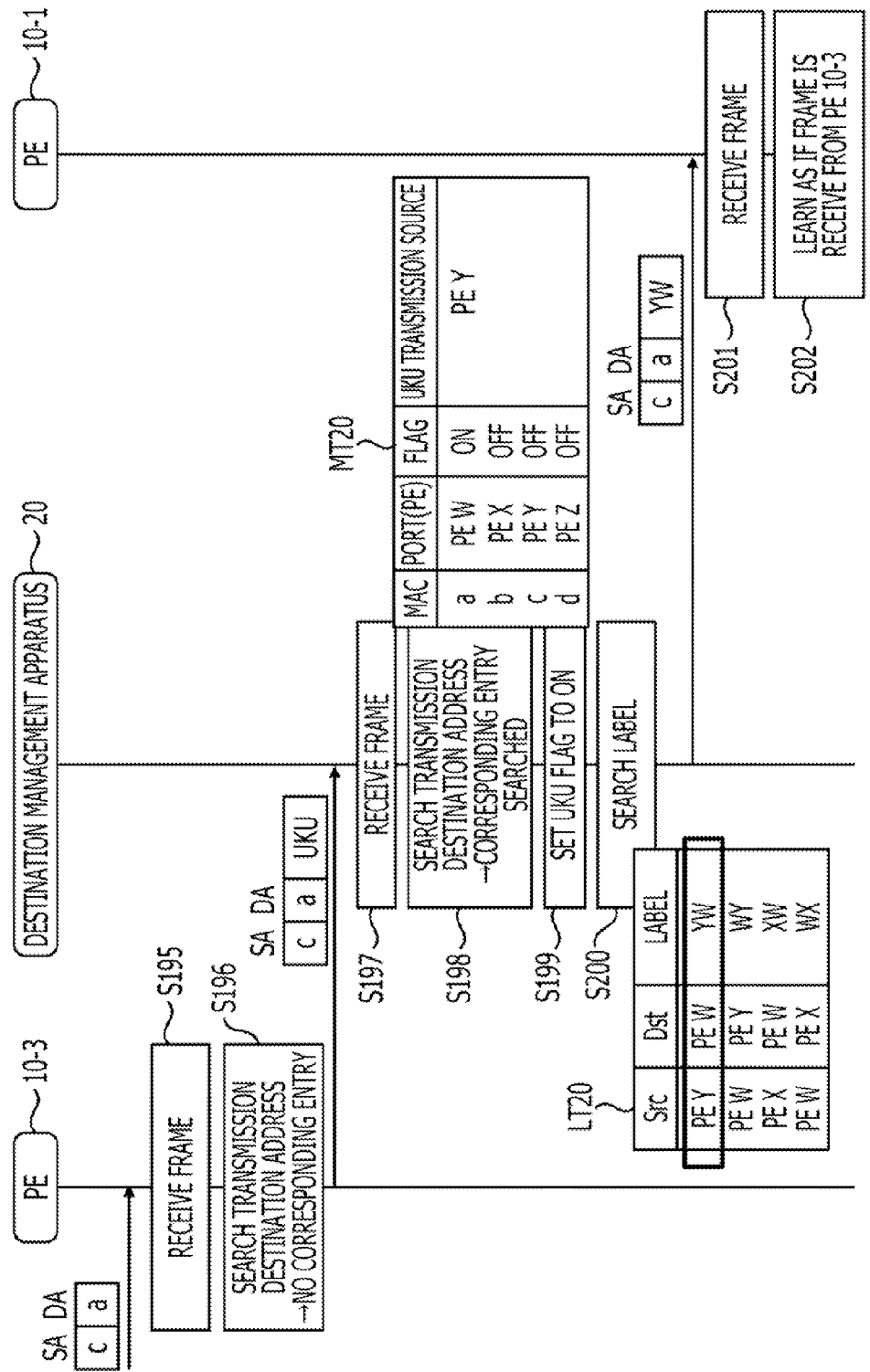
FIG. 19 is a flowchart illustrating an operation example of the transmission system illustrated in FIG. 17.

Based on the transmission source address and the transmission destination address of the received frame, the destination management apparatus 20 searches the label added to the frame from the label table LT20 (Operation S200 in FIG. 19). In this example, the label YW is searched and is then added to the frame. The frame is transferred to the PE 10-1. The destination management apparatus 20 may generate (recognize) a label table based on the information collected from the PEs 10 using the SNMP or the like.

If the PE 10-1 receives the frame added with the label YW from the destination management apparatus 20 (Operation S201 in FIG. 19), the PE 10-1 may learn the transmission source address c included in the frame in association with the label YW. That is, the PE 10-1 may recognize and learn as if the frame transferred from the destination management apparatus 20 is transmitted from the PE 10-3 (Operation S202 in FIG. 19).

Figure 20:
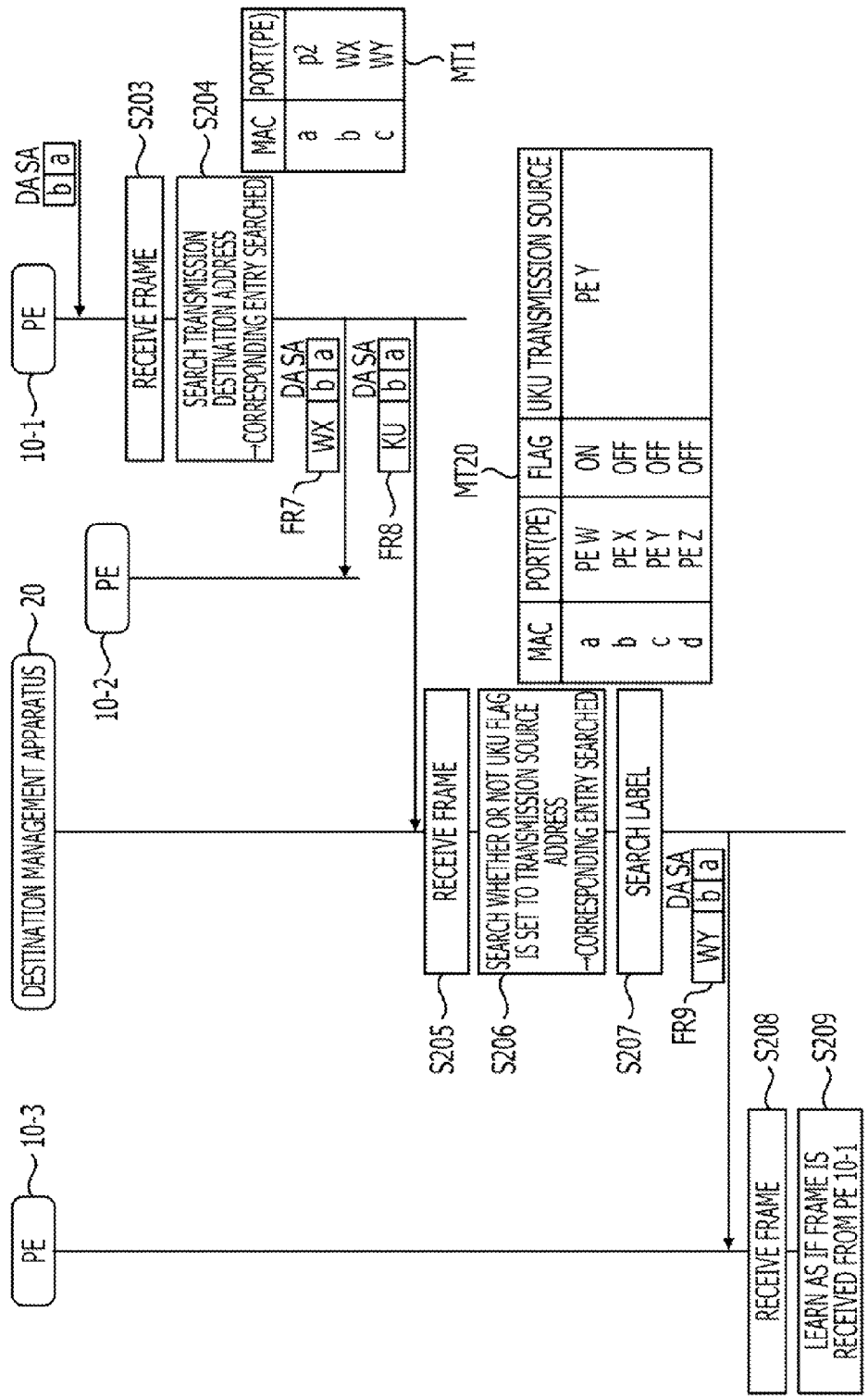
FIG. 20 is a flowchart illustrating another operation example of the transmission system illustrated in FIG. 17.

The PE 10-1 receives the frame that has the transmission source address a and the transmission destination address b from the router R-a (Operation S203 in FIG. 20). The PE 10-1 searches (determines) whether or not the address entry related to the transmission destination address b included in the received frame is stored in the storage unit 11. Since the storage unit 11 of the PE 10-1 stores the address entry related to the transmission destination address b (Operation S204 in FIG. 20), the storage unit 11 of the PE 10-1 adds the label WX to the frame FR7 having the transmission source address a and the transmission destination address b and then transmits the frame FR7 to the port WX coupled to the PE 10-2.

On the other hand, the PE 10-a adds the KU to the frame FR8, which has the transmission source address a and the transmission destination address b, and transmits the frame FR8 to the destination management apparatus 20. If the destination management apparatus 20 receives the frame FR8 added with the KU by the PE 10-1 (Operation S205 in FIG. 20), the destination management apparatus 20 searches (determines) whether or not the UKU flag is set to ON to the address entry related to the transmission source address a included in the received frame. Since the UKU flag is set to be turned on to the address entry related to the transmission destination address a (Operation S206 in FIG. 20), the management unit 21 determines to transfer the learning frame to the PE 10-3. At this time, the destination management apparatus 20 searches the label to be added to the frame from the label table LT20 (Operation S207 in FIG. 20). In this example, the label WX is searched and is then added to the frame FR9. The frame FR9 is transferred to the PE 10-3. The destination management apparatus 20 may generate (recognize) a label table based on the information collected from the PEs 10 by using the SNMP or the like.

If the PE 10-3 receives the frame FR9 added with the label WX from the destination management apparatus 20 (Operation S208 in FIG. 20), the PE 10-3 may learn the transmission source address a included in the frame in association with the label WX. That is, the PE 10-3 may recognize and learn as if the frame FR9 transferred from the destination management apparatus 20 is transmitted from the PE 10-1 (Operation S209 in FIG. 20).

That is, if the frame received by one of the first ports p1 is added with the UKU indicating that the frame is unlearned by the transmission apparatus 10, based on the address entry managed by the management unit 21, the transfer control unit 22 has a function for transferring the frame added with the UKU to the first port p1, from among the first ports p1, associated with the transmission destination address included in the frame.

If the frame FR7 received by one of the first ports p1 is added with the KU indicating that the transmission apparatus 10 learned the frame, the transfer control unit 22 has a function for transferring the frame FR7 added with the KU to the PE 10-3 as a destination different from the transmission destination address included in the frame FR. On the other hand, the PE 10-3, which receives the learning frame FR9 from the destination management apparatus 20, learns (complements) the MAC address a based on the frame FR9. Since the frame FR9 for learning received from the destination management apparatus 20 is added with the label WY, the PE 10-3 may learn as if the frame FR9 is transmitted from the PE 10-1.

That is, the second port p2 of the present application has a function for receiving, from the destination management apparatus 20, the frame FR9 with the label having the information that indicates at least the transmission source of the frame. The storage unit 11 according to the present embodiment has a function for storing the address entry indicating the relation between the transmission source address, which is included in the frame FR9 with the label received by the above-described second port p2, and the first port p1 coupled to the transmission source indicated by the label information from among the first ports p1.

According to the present embodiment, the similar effect as the above-described embodiment may be achieved, and the learning omission state of the PE 10 may be improved in an early stage. Therefore, occurrence of the transmission delay and load increase of the destination management apparatus 20 may be suppressed.

[3] Second Deformation Example

Figure 21:
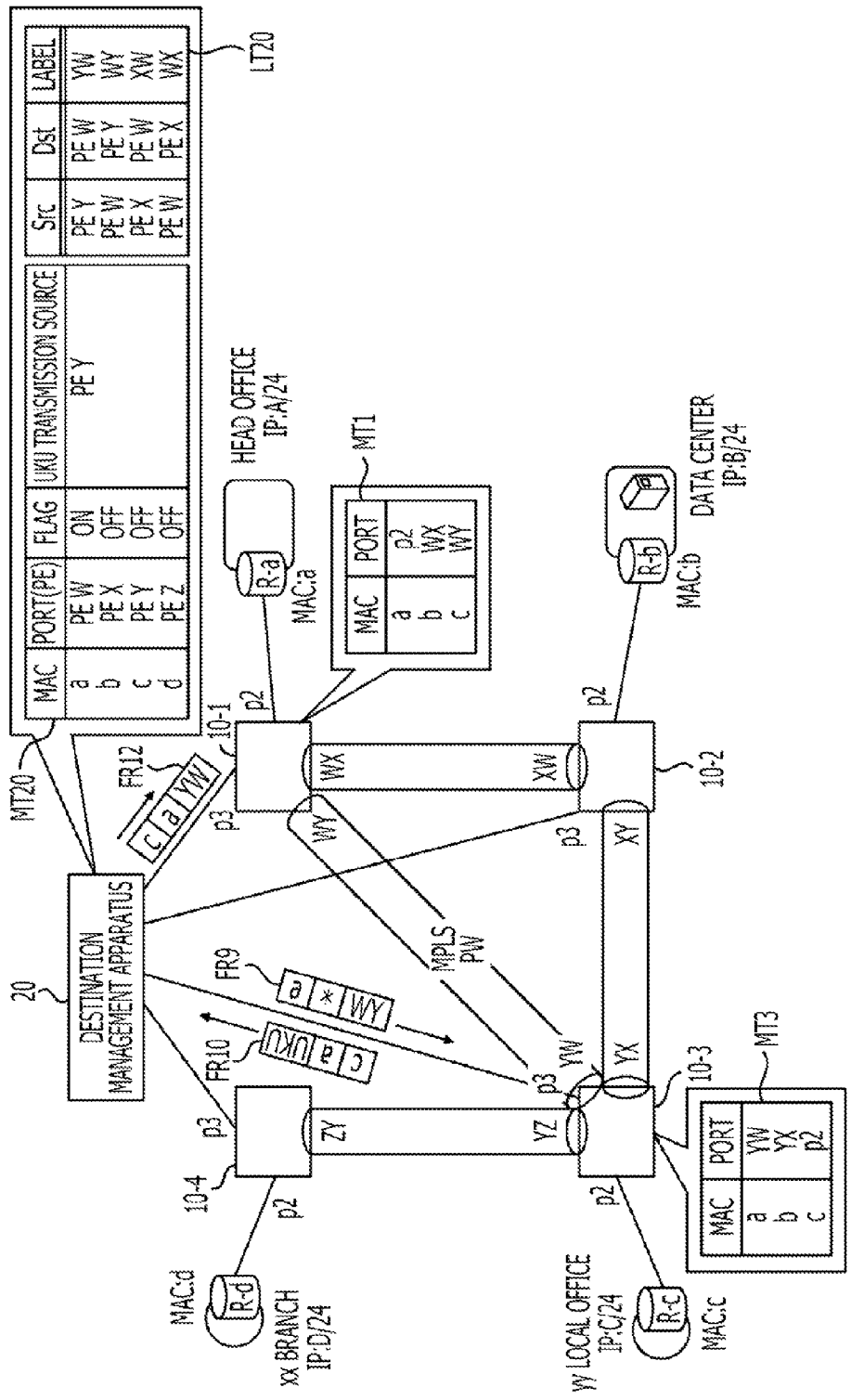
FIG. 21 is a diagram illustrating a configuration example of a transmission system according to a second embodiment of the present application.
Figure 22:
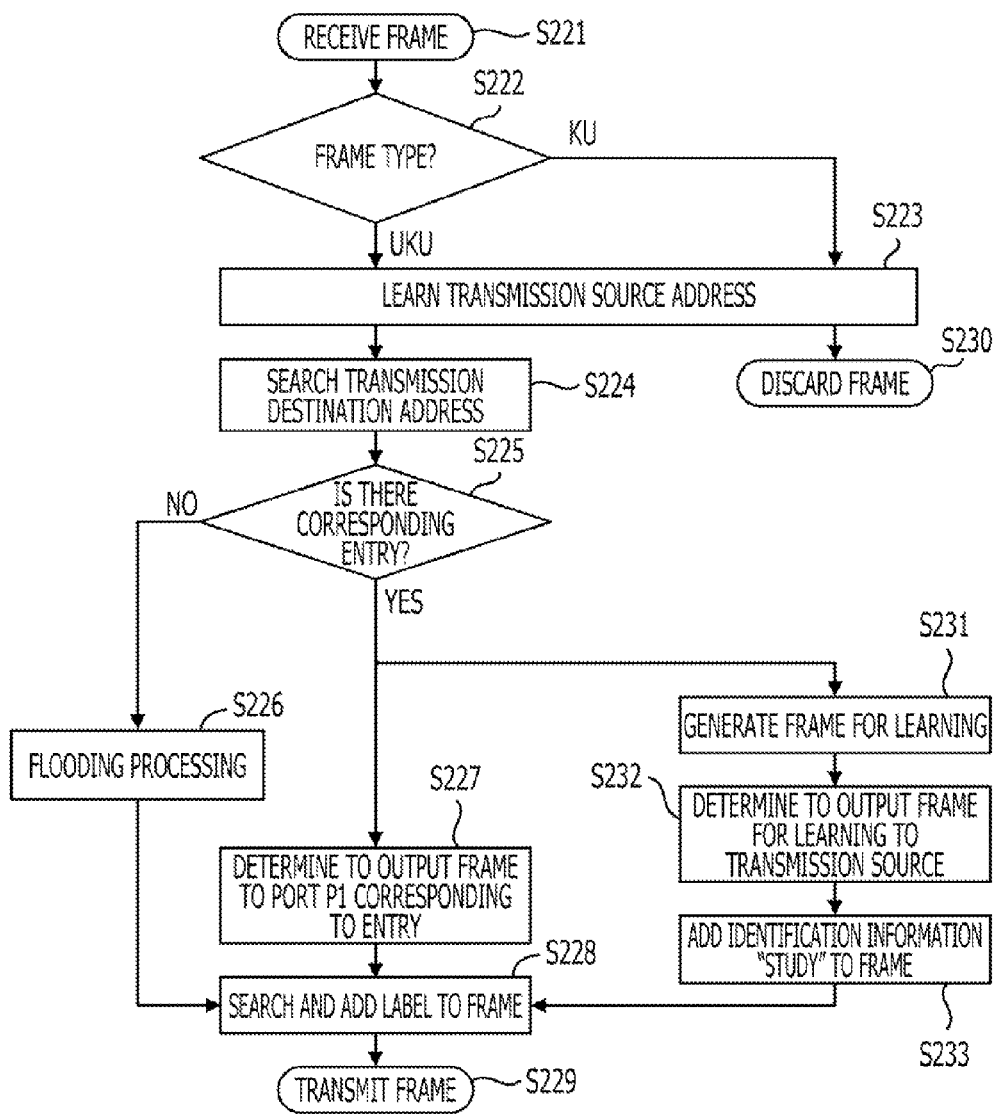
FIG. 22 is a flowchart illustrating an operation example of the destination management apparatus illustrated in FIG. 21.

As illustrated in FIG. 21, according to the present embodiment, when the destination management apparatus 20 receives the frame FR10, the destination management apparatus 20 may transfer the frame FR12 added with the label to the PE 10-1 and generate the frame FR11 for destination learning (Operation S231 in FIG. 22), and transfer the frame FR11 for learning having the transmission destination address a of the frame FR10 as the transmission source address (Operation S232 in FIG. 22). The learning frame FR11 may be added with identification information "STUDY" indicating that the frame is for learning (Operation S233 in FIG. 22). In FIG. 22, Operations S221 to S230 illustrate the processing equivalent to Operations S131 to S140 in FIG. 13.

That is, if the frame received by one of the first ports p1 is added with the UKU indicating that the address entry related to the transmission destination address is not stored in the storage unit 11, the transfer control unit 22 according to the present embodiment has a function for transferring the frame for destination learning to the transmission source of the frame. The transfer control unit 22 according to the present embodiment has a function for having the transmission destination address included in the above-described frame as a transmission source address, generating a frame with a label having label information indicating at least the transmission destination of the frame, and transferring the frame with the label to the transmission source of the frame added with the UKU.

An operation example of the transmission system illustrated in FIG. 21 will be described with reference to FIG. 23. The PE 10-3 receives the frame that has the transmission source address c and the transmission destination address a from the router R-c (Operation S234 in FIG. 23). The PE 10-3 searches (determines) whether the address entry related to the transmission destination address a included in the received frame is not stored in the storage unit 11. However, since the storage unit 11 of the PE 10-3 does not store the address entry related to the transmission destination address a (Operation S235 in FIG. 23), the storage unit 11 of the PE 10-3 adds the UKU to the frame FR10 having the transmission source address c and the transmission destination address a and then transmits the frame FR10 simply to the destination management apparatus 20.

When receiving the frame FR10 added with the UKU from the PE 10-3, the destination management apparatus 20 searches (determines) whether or not the address entry related to the transmission destination address a included in the received frame is not stored in the management unit 21. Since the management unit 21 stores the address entry related to the transmission destination address a (Operation S237 in FIG. 23), the management unit 21 determines to transfer the frame FR12 to the PE 10-1 based on the address entry related to the MAC address a included in the MAC table MT20. At this time, based on the transmission source address and the transmission destination address of the received frame, the destination management apparatus 20 searches the label to be added to the frame from the label table LT20 (Operation S238 in FIG. 23). According to the present embodiment, the label YW is searched and is then added to the frame FR12, and the frame FR12 is transferred to the PE 10-1. Based on the information collected from the PEs 10 by using a Simple Network Management Protocol (SNMP), the destination management apparatus 20 may generate (recognize) the label table.

When receiving the frame FR12 added with the label YW from the destination management apparatus 20 (Operation S239 in FIG. 23), the PE 10-1 may learn the transmission source address c included in the frame FR12 in association with the label YW. That is, the PE 10-1 recognizes as if the frame FR12 is transmitted from the PE 10-3 (Operation S240 in FIG. 23).

Figure 23:
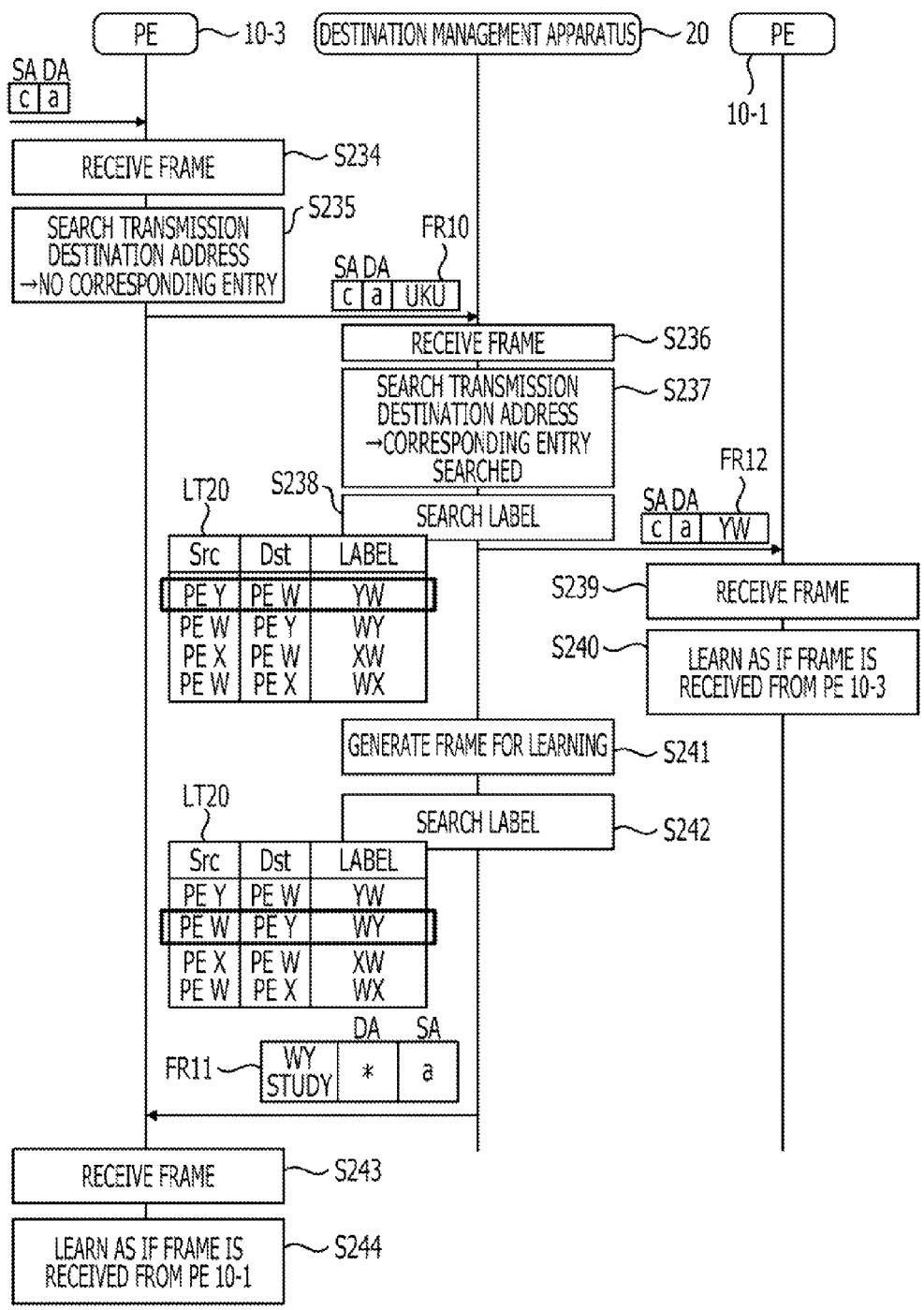
FIG. 23 is a flowchart illustrating another operation example of the transmission system illustrated in FIG. 21.

The destination management apparatus 20 generate the frame FR11 for learning to make the PE 10-3 learn the destination (for example, the MAC address a) (Operation S241 in FIG. 23). Based on the transmission source address c and the transmission destination address a of the frame FR10, the destination management apparatus 20 searches the label to be added to the frame from the label table LT20 (Operation S242 in FIG. 23). In this example the label WY is searched and is then added to the frame FR11.

The frame FR11 is simply a frame for learning. For example, the frame FR11 is preferable not to be transferred from the PE 10-3 to the terminal of the LAN in the local office. The destination management apparatus 20 may add the STUDY, which indicates that the frame FR11 is a frame for learning, to the frame FR11 and may transmit the frame FR11 to the PE 10-3. The PE 10-3, which receives the frame FR11 added with the STUDY, may recognize that the frame FR11 is a frame for learning and may, for example, discard the frame FR11 without transferring the frame FR11. Due to this, the frame FR11 for learning may have an arbitrary MAC address as a transmission destination address.

In addition to the UKU and the KU, the STUDY may be set to an option area called CW included in the frame, for example. Specifically, for example, the frame in which 3 is set to the area may be set as the frame added with the identification information STUDY. When receiving the frame added with the label WY and the STUDY form the destination management apparatus 20 (Operation S243 in FIG. 23), the PE 10-3 may learn the transmission source address a included in the frame FR11 in association with the label WY. That is, the PE 10-3 may recognize and learn as if the frame FR11 is transmitted from the PE 10-1 (Operation S244 in FIG. 23).

Therefore, according to the present embodiment, the effect equivalent to the above-described embodiment may be achieved, and the learning omission of the PE 10 may be improved in an early stage.

[4] Third Deformation Example

According to the above-described embodiments and deformation example, every time the PE 10 receives the learned frame, the frame is transmitted to the third port p3 coupled to the destination management apparatus 20. As a result, the traffic amount of the frame for learning transmitted from the PE 10 to the destination management apparatus 20 may increase.

Every time the PE 10 receives the learned frame, the PE 10 is not desired to transmit the frame to the third port p3 coupled to the destination management apparatus 20. Specifically, for example, the PE 10 may transmit the frame for learning to the third port p3 in a transmission interval in which the frame is not subjected to the aging processing in the MAC table MT20 of the destination management apparatus 20. Therefore, the PE 10 in this example has a MAC table that includes at least a MAC field, a PORT field, an aging timer field, and a copy timer field. The MAC field may be stored in the storage unit 11 of the PE 10 in the similar way as the above-described embodiment and deformation example.

Figure 24:
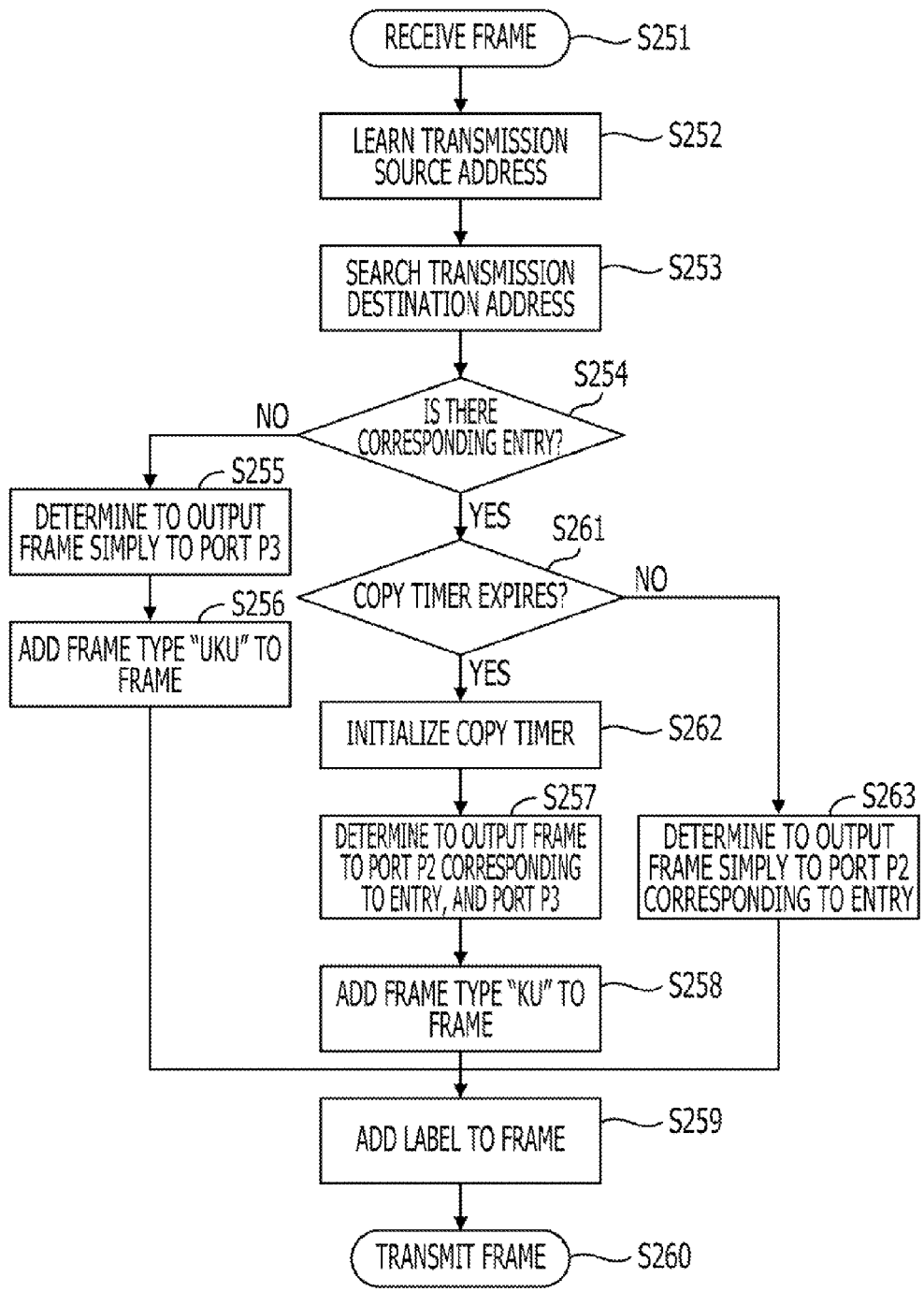
FIG. 24 is a flowchart illustrating an operation example of a transmission apparatus according to a third embodiment of the present application.

That is, as illustrated in FIG. 24, when the PE 10 in this example receives the frame by one of the second ports p2 (Operation S251), the transmission source address learning unit 121 learns the transmission source address of the frame in association with the reception port of the frame (Operation S252). The learning result is stored in the MAC table 111. The transmission destination address searching unit 122 searches the transmission source address included in the received frame from the address entry stored in the MAC table 111 (Operation S253) and then determines whether the transmission source address is learned or not (Operation S254).

If the transmission destination address searching unit 122 determines that the transmission source address included in the received frame is not stored in the MAC table 111 (NO in Operation S254), the output port determining unit 123 determines to output the frame simply to the third port p3 (Operation S255). The frame type adding unit 124 adds the frame type "UKU" to the frame (Operation S256), and the label adding unit 125 adds the label to the frame based on the content of the label table 112 (Operation S259).

The frame subjected to the frame processing in Operations S255, S256, and S259 is transmitted from the destination determined by the output port determining unit 123 to the network (Operation S260). On the other hand, if the transmission destination address searching unit 122 determines that the transmission destination address included in the received frame is stored in the MAC table 111 (YES in Operation S254), the output port determining unit 123 determines whether the copy timer related to the transmission destination address of the frame expires or not (Operation S261). Specifically, for example, the output port determining unit 123 determines whether the value of the copy timer is equal to or more than a prescribed value.

If the output port determining unit 123 determines that the value of the copy timer is smaller than the prescribed value (NO in Operation S261), the output port determining unit 123 determines to output the frame simply to the second port p2 corresponding to the transmission destination address of the received frame (Operation S263). In this example, as described above, the PE 10 may not transmit the frame for learning to the destination management apparatus 20. The label adding unit 125 adds the label based on the content of the label table 112 (Operation S259).

The frame subjected to the frame processing in Operation S260 is transmitted from the destination determined by the output port determining unit 123 to the network (Operation S260). If the output port determining unit 123 determines that the value of the copy timer is equal to or more than the prescribed value (YES in Operation 261), the output port determining unit 123 clears (initializes) the value of the timer stored in the MAC table 111 (Operation S262).

The output port determining unit 123 determines to output the frame to the second port p2 and the third port p3 corresponding to the transmission destination address of the frame (Operation S257). The frame type adding unit 124 adds the frame type "KU" to the frame (Operation S258), and the label adding unit 125 adds the label to the frame based on the content of the label table 112 (Operation S259).

The frame subjected to the frame processing in Operations S257 to S259 is transmitted from the destination determined by the output port determining unit 123 to the network (Operation S260). That is, until a prescribed time elapses after the frame is transmitted to the third port p3 and the second port p2, if the frame having the transmission destination address associated with the address entry stored in the storage unit 11 is received, the transmission control unit 12 according to the present embodiment has a function for transmitting the frame simply to the second port p2 associated with the transmission destination address by the address entry.

Examples of the operation of the PE 10 of this example are illustrated in FIGS. 25A to G. As illustrated in FIG. 25A, for example, if all the frames are unlearned, the PE 10 receives the frame that has the transmission source address (SA) a and the transmission destination address (DA) b by the port p2-1. The PE 10 receives the frame with the transmission source address a by the port p2-1 and generates the address entry that associates the MAC address a with the port p2-1. At this time, the initial values of the aging timer and the copy timer are 0, respectively.

On the other hand, since the MAC table of the PE 10 does not store the address entry related to the transmission destination address b, the PE 10 transmits the frame received by the port p2-1 simply to the port p3 coupled to the destination management apparatus 20. FIG. 25B illustrates a state 10 seconds later from the state illustrated in FIG. 25A. As illustrated in FIG. 25B, the PE 10 receives the frame having the transmission source address b and the transmission destination address a by the port p2-2.

Since the PE 10 receives the frame, which has the transmission source address b, by the port p2-2, the PE 10 generate an address entry by which the MAC address b is associated with the port p2-2. At this time, the aging timer and the copy timer related to the MAC address a indicates 10, and the initial value of the aging timer and the copy timer related to the MAC address b indicate 0, respectively. On the other hand, since the MAC table of the PE 10 stores the address entry related to the transmission destination address a, the PE 10 transmits the frame received by the port p2-2 to the port p2-1 associated with the transmission destination address a.

FIG. 25C illustrates a state 10 seconds later from the state illustrated in FIG. 25B. As illustrated in FIG. 25C, the PE 10 receives the frame, which has the transmission source address a and the transmission destination address b, by the port p2-1. Since the PE 10 receives the frame, which has the transmission source address a, by the port p2-1, the PE 10 initializes the aging timer of the address entry by which the MAC address a is associated with the port p2-1. At this time, the copy timer related to the MAC address a indicates 20, and the aging timer and the copy timer related to the MAC address b indicate 10, respectively.

On the other hand, the MAC table of the PE 10 stores the address entry related to the transmission destination address b and the copy timer related to the transmission source address a is smaller than a prescribed value (for example, 300), the PE 10 transmits the frame received by the port p2-1 simply to the port p2-2 associated with the transmission destination address b. FIG. 25D illustrates a state 10 seconds later from the state illustrated in FIG. 25C. As illustrated in FIG. 25D, the PE 10 receives the frame, which has the transmission source address b and the transmission destination address a, by the port p2-2.

Since the PE 10 receives the frame, which has the transmission source address b, by the port p2-2, the PE 10 initializes the aging timer of the address entry by which the MAC address b is associated with the port p2-2. At this time, the copy timer related to the MAC address b indicates 20, and the aging timer and the copy timer related to the MAC address a indicate 10 and 30, respectively. On the other hand, since the MAC table of the PE 10 stores the address entry related to the transmission destination address a and the copy timer related to the transmission destination address a. Thus, the PE 10 transmits the frame received by the port p2-2 simply to the port p2-1 in association with the transmission destination address a.

FIG. 25E illustrates a state 270 seconds later from the state illustrated in FIG. 25D. As illustrated in FIG. 25E, the PE 10 receives the frame having the transmission source address a and the transmission destination address b by the port 2-1. Since the PE 10 receives the frame, which has the transmission source address a, by the port p2-1, the PE 10 initializes the again timer of the address entry by which the MAC address a is associated with the port p2-1. At this time, the aging timer and the copy timer related to the MAC address b indicate 270 and 290, respectively.

On the other hand, the MAC table of the PE 10 stores the address entry related to the transmission destination address b and the copy timer related to the transmission source address a indicates a value that is equal to or more than the prescribed value. Therefore, the PE 10 transmits the frame received by the port p2-1 both to the port p2-2 that is associated with the transmission destination address b and to the port p3 coupled to the destination management apparatus 20. The PE 10 initializes the copy timer of the address entry by which the MAC address a is associated with the port p2-1.

FIG. 25F illustrates a state 10 more seconds later from the state illustrated in FIG. 25E. As illustrated in FIG. 25F, the PE 10 receives the frame, which has the transmission source address b and the transmission destination address a, by the port p2-2. Since the PE 10 receives the frame, which has the transmission source address b, by the port p2-2, the PE 10 initializes the aging timer of the address entry by which the MAC address b is associated with the port p2-2. At this time, the aging timer and the copy timer related to the MAC address a indicate 10, respectively.

On the other hand, the MAC table of the PE 10 stores the address entry related to the transmission destination address a, and the copy timer related to the transmission source address b is equal to or more than the prescribed value. Therefore, the PE 10 transmits the frame received by the port p2-2 to both the port p2-1 in association with the transmission destination address a and the port p3 coupled to the destination management apparatus 20. The PE 10 initializes the copy timer of the address entry by which the MAC address b is associated with the port p2-2.

FIG. 25G illustrates a state a sufficient time later from the state illustrated in FIG. 25F. As illustrated in FIG. 25G, if the aging timer indicates a prescribed value (for example, 300) or more, the PE 10 deletes the corresponding address entry. According to the present embodiment, the traffic amount of the frame transmitted from the PE 10 to the destination management apparatus 20 may be suppressed, so that the network load may be reduced.

In the example illustrated in FIG. 25, an aging period (a first aging time) in the destination management apparatus 20 is assumed to be 30 seconds, and the upper limit value of the copy is set to 300 seconds. In this case, the transmission of the frame for learning from the PE 10 to the destination management apparatus 20 is performed for each address entry once every 300 seconds at most. For example, if the number of address entries stored in the MAC table is 1 million and if the length of the packet to be transmitted is 64B, the traffic amount of the frame for learning may be compressed to the traffic amount of approximately 1.7 Mbps. For example, even if the packet length is 1518B, the traffic amount of the frame for learning may be compressed to the traffic amount of approximately 40 Mbps.

In the example illustrated in FIG. 25, the upper limit value (a second aging timer) of the aging timer of the MAC table of the PE 10 and the upper limit value of the copy timer are 300 seconds. Moreover, the upper limit value of the aging timer may be different from the upper limit value of the copy timer. In the example illustrated in FIG. 25, the aging time of the destination management apparatus 20 is assumed to be 300 seconds, and the upper limit value of the copy timer is set to 300 seconds. However, the upper limit value of the copy timer may be equal to or longer than the aging time (the first aging time) of the destination management apparatus 20.

[5] Forth Deformation Example

As described above, if the frame received from the PE 10 is unlearned in the destination management apparatus 20, the destination management apparatus 20 performs the flooding processing on the port except the reception port. Since the destination management apparatus 20 may receive the frame for learning from each of the PEs 10 existing in the network, the learning omission of the frame does not occur in general. Even if the learning omission occurs, the learning omission lasts simply until the frame for learning is received. Accordingly, there is less possibility that the flooding processing is continuously occurred for a long time.

Figure 26:
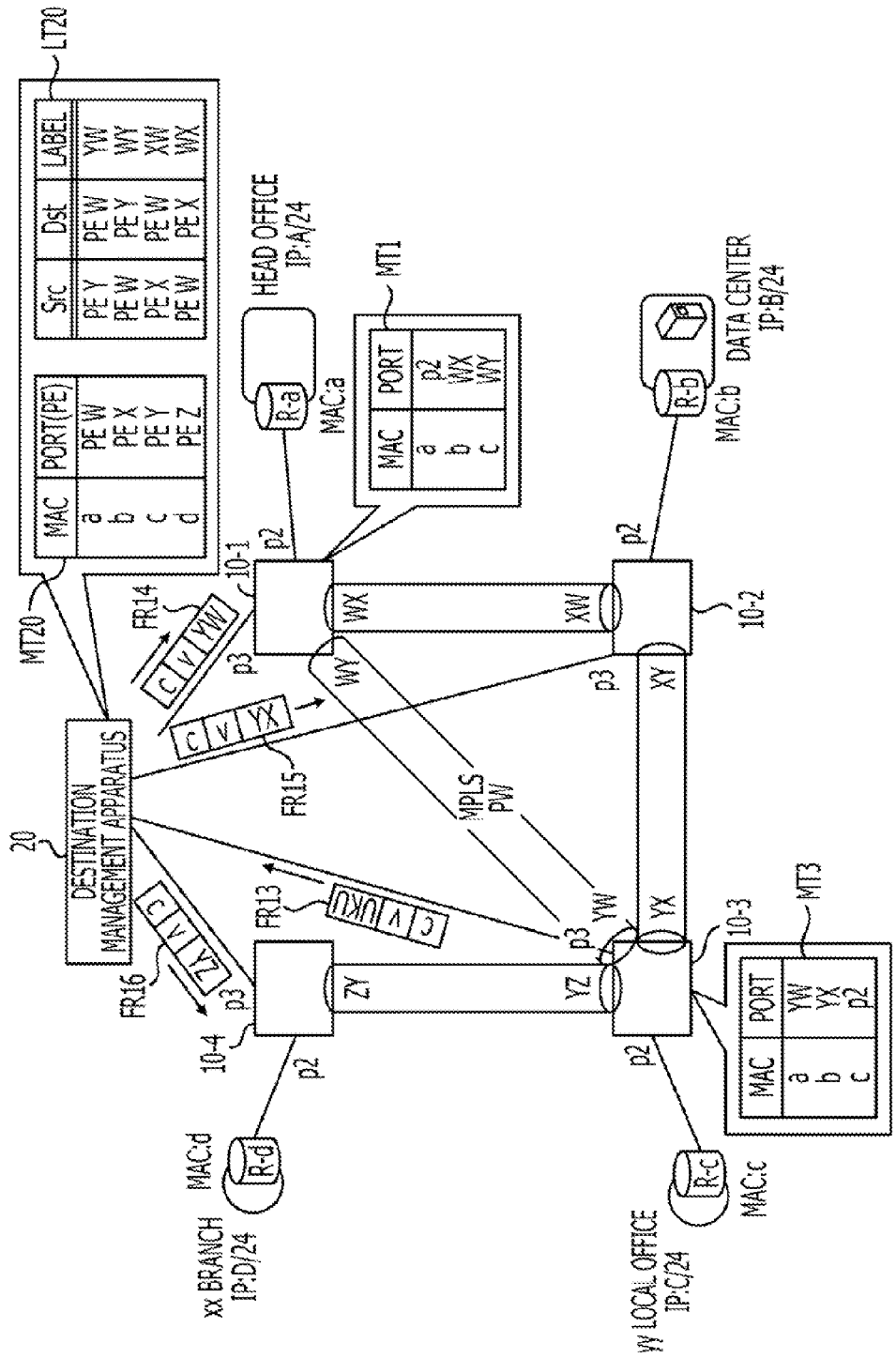
FIG. 26 is a diagram illustrating a configuration example of a transmission system according to a fourth embodiment of the present application.

However, for example, if a terminal is infected with computer virus, a packet may be transmitted to a MAC address as a transmission destination that does not exist on the network. As a result, the frame subjected to the flooding processing may put pressure on the network traffic. For example, as illustrated in FIG. 26, if the frame, which has the transmission destination address v that does not exist on the network is transmitted from the router R-c to the PE 10-3, the MAC table MT3 does not store the address entry related to the transmission destination address v. Thus, the PE 10-3 transmits the frame FR13, which has the transmission source address c and the transmission destination address v, simply to the destination management apparatus 20.

However, since the transmission destination address v does not exist on the network, the destination management apparatus 20 does not know the destination of the frame FR13. In this case, the destination management apparatus 20 transfers (flooding) the frame FR13 as the frame FR14, the frame FR15, and the frame FR16 to all the ports other than the reception port. At this time, if the occurrence of the above-described flooding processing meets a prescribed condition, the destination management apparatus 20 according to the present embodiment instructs the PE 10-3 as the transmission source of the frame FR13 subjected to the flooding processing not to transmit the frame FR13.

Figure 27:
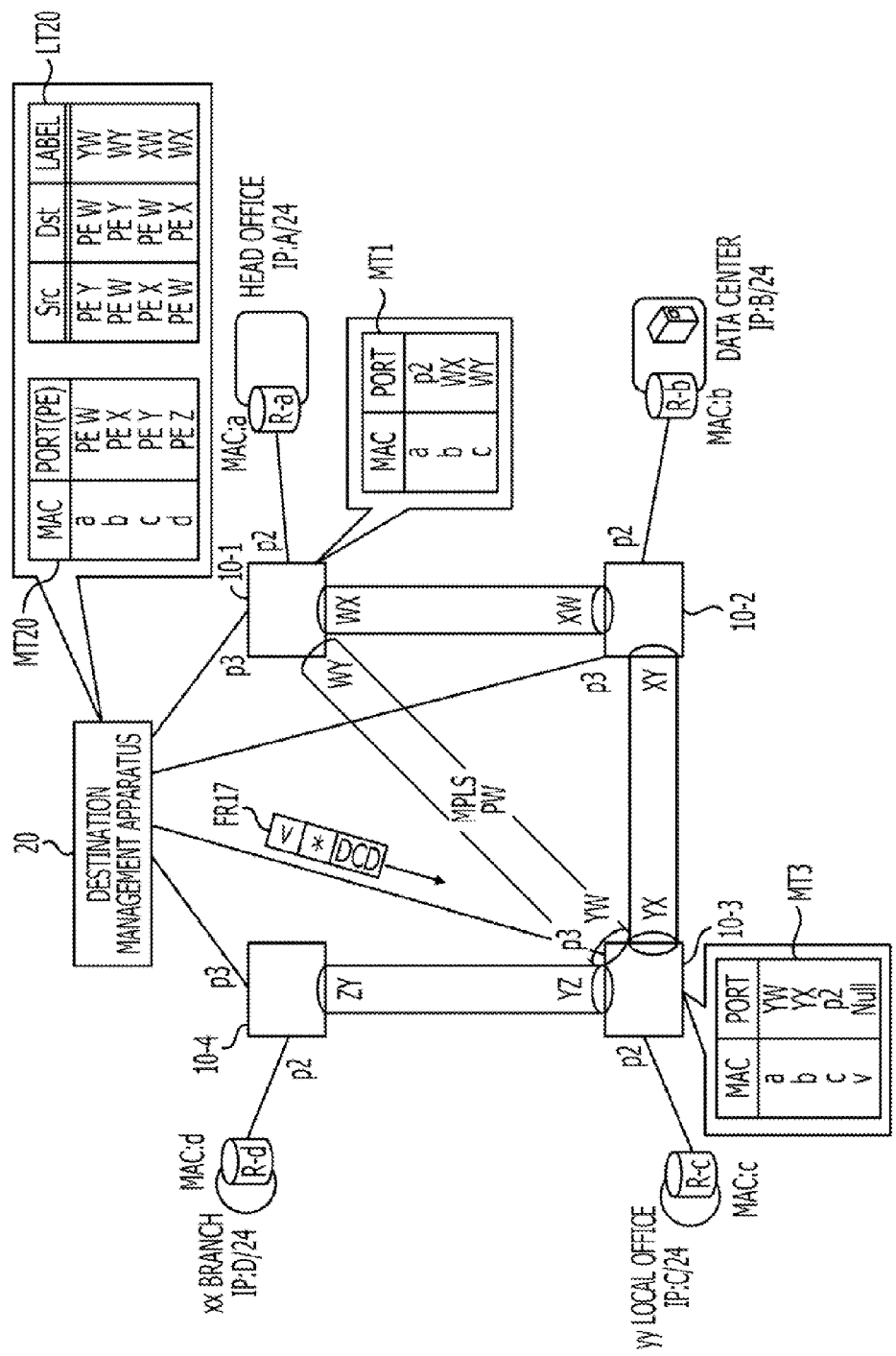
FIG. 27 is a diagram illustrating another configuration example of the transmission system according to the fourth embodiment of the present application.

Specifically, for example, as illustrated in FIG. 27, since the transmission of the frame FR13 that is to be subjected to the flooding processing is stopped, the transfer control unit 22 generates the frame FR17 added with the discard information added with the information (DCD) indicating the discarding of the frame. The transfer control unit 22 transmits the frame FR17 added with the discard information to the PE 10-3 as the transmission source of the frame FR13. For example, the DCD may be set to an optical area called the CW included in the frame. Specifically, the Reserved area included in the CW may be used as an area for frame identification. For example, the frame in which 4 is set to the area may be used as a frame added with the DCD.

The MAC address v is set to the transmission source address of the frame FR17 added with the discard information. The PE 10-3 that receives the frame FR17 stores, for example, the address entry by which the transmission source address v is associated with the Null port. The PE 10-3 may discard the frame even if the frame having the transmission destination address v is received from another apparatus.

That is, the second port p3 according to the present embodiment has a function for receiving the frame FR17 with the discard information added with the OCD from the destination management apparatus 20. If one of the second ports p2 receives the frame to be transmitted to the transmission source address v included in the frame FR17 added with the discard information received by the above-described third port p3, the transmission control unit 11 according to the present embodiment has a function for discarding the frame without transmitted the frame.

Figure 28:
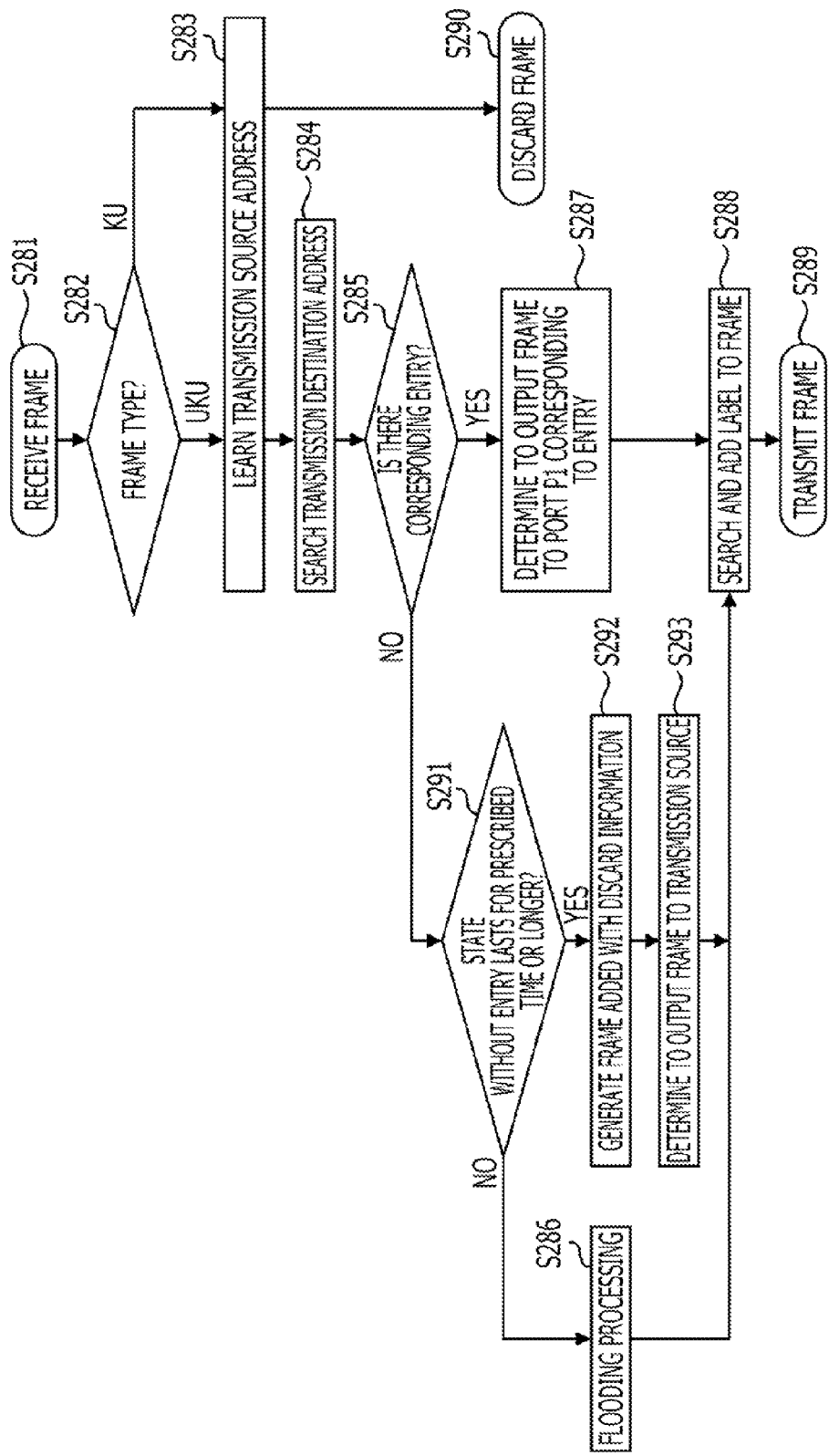
FIG. 28 is a flowchart illustrating an operation example of a destination management apparatus according to a fourth embodiment of the present application.

FIG. 28 illustrates an operation example of the destination management apparatus 20 according to the present embodiment. If one of the first ports p1 receives the frame (Operation S281), the frame type identifying unit 224 identifies the frame type added to the frame (Operation S282). If the frame type is identified as the KU by the frame type identifying unit 224 (KU route in Operation S282), the transmission source address learning unit 221 learns the transmission source address of the frame in association with the reception port of the frame (Operation S283). The learning result is stored in the MAC table 211.

After the frame is learned by the transmission source address learning unit 221, the output port determining unit 223 discards the frame without transferring the frame (Operation S290). On the other hand, if the frame type identifying unit 224 identifies the frame type as the UKU (UKU route in Operation S282), the transmission source address learning unit 221 learns the transmission source address of the frame in association with the reception port of the frame (Operation S283). The learning result is stored in the MAC table 211.

The transmission destination address searching unit 222 searches the transmission destination address included in the received frame from the address entry stored in the MAC table 211 (Operation S284) and then determines whether or not the transmission destination address is learned or not (Operation S285). At this time, if the transmission destination address included in the received frame is stored in the MAC table 211 (YES in Operation S285), the output port determining unit 223 determines to output the frame to the first port p1 corresponding to the transmission destination address of the frame (Operation S287).

Furthermore, based on the transmission source address and the transmission destination address of the frame, the label adding unit 125 searches the label to be added to the frame from the label table 212 and adds the searched label to the frame (Operation S288). The frame subjected to the frame processing in Operations S287 and S288 is transmitted from the destination determined by the output port determining unit 223 to the network (Operation S289).

If the MAC table 211 does not store the transmission source address included in the received frame (NO in Operation S285), the output port determining unit 223 determines whether or not a state, in which the MAC table 211 does not store the transmission destination address included in the received frame, lasts for a prescribed period (Operation S291). If the output port determining unit 223 determines that the transmission destination address included in the received frame is not stored in the MAC table 211 for the prescribed time or longer (NO in Operation S291), the output port determining unit 223 determines to output the frame to all the first ports p1 other than the reception port (flooding processing) (Operation S286).

On the other hand, if the output port determining unit 223 determines that the transmission destination address included in the received frame is not stored in the MAC table 211 for the prescribed time or longer (YES in Operation S291), the output port determining unit 223 generates the frame added with the discard information (DCD) (Operation S292) and then determines to transmit the frame to the destination source of the received frame (Operation S293).

Based on the transmission source address and the transmission destination address of the frame, the label adding unit 125 searches the label to be added to the frame from the label table 212 and then adds the searched label to the frame (Operation S288). The frame subjected to the frame processing in Operations S286, S292, S293, and S288 is transmitted to the destination determined by the output port determining unit 223 (Operation S289).

Figure 29:
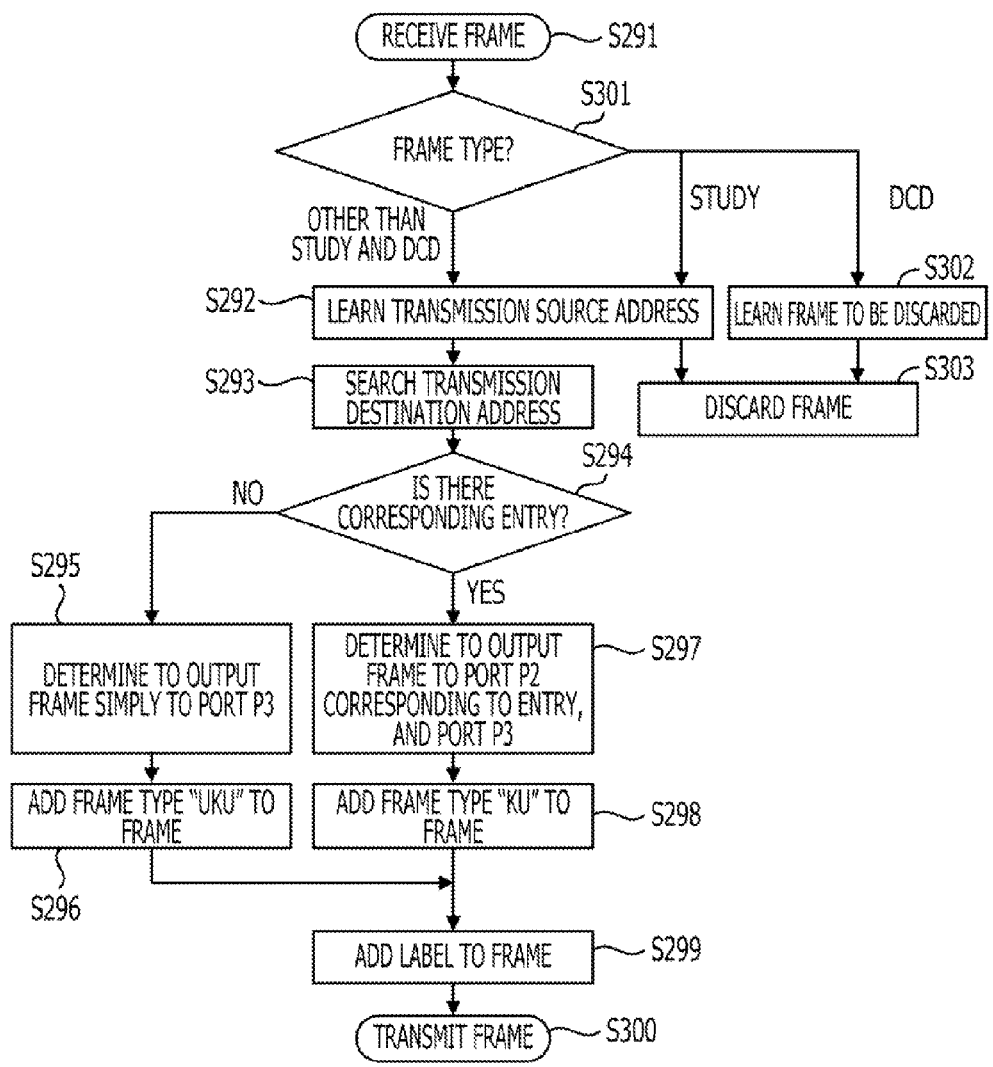
FIG. 29 is a flowchart illustrating an operation example of the transmission apparatus according to the fourth embodiment of the present application.

An operation example of the PE 10 according to the present embodiment will be described with reference to FIG. 29. If one of the second ports p2 receives the frame (Operation S291), the transmission control unit 12 identifies the frame type added to the frame (Operation S301). If the transmission control unit 12 identifies that the frame type is not STUDY or DCD (the route other than STUDY or DCD in Operation S301), the transmission source address learning unit 121 learns the transmission source address in association with the reception port of the frame (Operation S292). The learning result is stored in the MAC table 111.

The transmission destination address searching unit 122 searches the transmission destination address included in the received frame from the address entry stored in the MAC table 111 (Operation S293) and then determines whether or not the transmission destination address is learned (Operation S294). At this time, if the transmission destination address searching unit 122 determines that the transmission destination address included in the received frame is not stored in the MAC table 111 (NO in Operation S294), the output port determining unit 123 determines to output the frame simply to the third port p3 (Operation S295).

The frame type adding unit 124 adds the frame type "UKU" to the frame (Operation S296), and the label adding unit 125 adds the label to the frame based on the content of the label table 112 (Operation S299). The frame subjected to the frame processing in Operations S295, S296, and S299 is transmitted from the destination determined by the output port determining unit 123 to the network (Operation S300).

If the transmission destination address searching unit 122 determines that the transmission destination address included in the received frame is stored in the MAC table 111 (YES in Operation S294), the output port determining unit 123 determines to output the frame to the second port p2 and the third port p3 corresponding to the transmission destination address of the frame (Operation S297). The frame type adding unit 124 adds the frame type "KU" to the frame (Operation S298), and the label adding unit 125 adds the label to the frame based on the content of the label table 112 (Operation S299).

The frame subjected to the frame processing in Operations S297 to S299 is transmitted from the destination determined from the output port determining unit 123 to the network (Operation S300). On the other hand, if the transmission control unit 12 identifies the frame type as STUDY (STUDY route in Operation S301), the transmission source address learning unit 121 learns the transmission destination address of the frame in association with the reception port of the frame (Operation S292). The learning result is stored in the MAC table 111.

The output port determining unit 123 determines that the frame is a frame for learning and discards the frame, for example, without transmitting the frame (Operation S303). If the transmission control unit 12 identifies the frame type as the DCD (DCD route in Operation S301), the transmission source address learning unit 121 learns the transmission source address learning unit 121 learns the transmission source address of the frame in association with the port setting value for discarding such as a Nu 11 value 11 (Operation S302). The learning result is stored in the MAC table 111.

The output port determining unit 123 determines that the frame is a discard frame, and then, for example, discards the frame to be discarded without transmitting the frame after receiving the frame. As a result, dispersion of the frame having the destination that does not exist in the network may be prevented, so that the increase of the network traffic may be suppressed.

[6] Fifth Deformation Example

Figure 30:
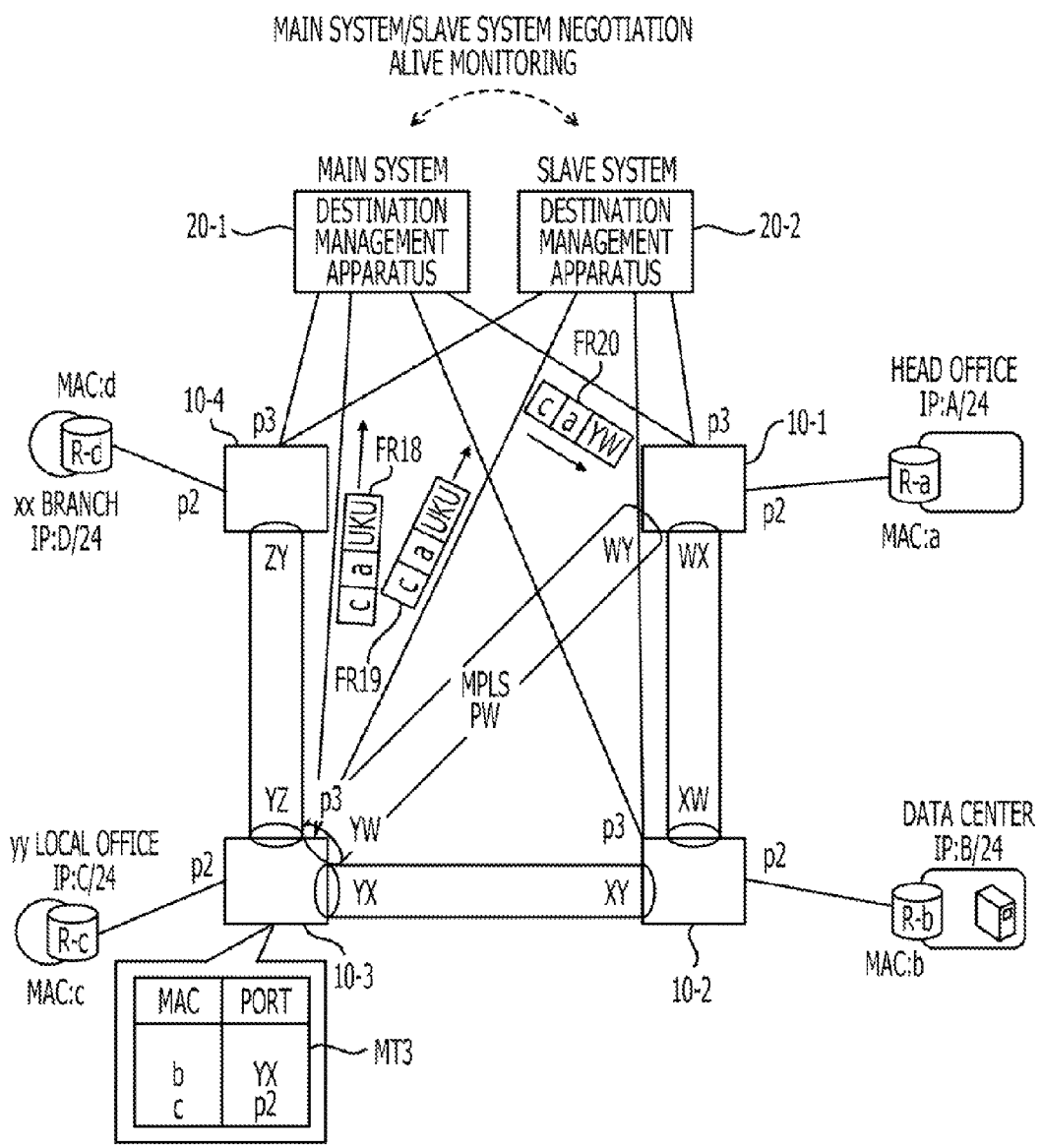
FIG. 30 is a diagram illustrating a configuration example of a transmission system according to a fifth embodiment of the present application.

As illustrated in FIG. 30, the destination management apparatus 20 may have a redundant configuration with at least the destination management apparatus 20-1 of the main system and one of the destination management apparatus 20-2 of the slave system. The destination management apparatus 20-1 of the main system has the configuration and function equivalent to the destination management apparatus 20. On the other hand, in addition to the configuration and function equivalent to the destination management apparatus 20, the destination management apparatus 20-2 of the slave system has a function for monitoring whether or not an error occurs in the destination management apparatus 20-1 of the main system.

The destination management apparatus 20-2 of the slave system has a function for switching the main/slave system if an error occurs in the destination management apparatus 20-1 of the main system. If no error occurs in the destination management apparatus 20-1 of the main system, frame transferring is not desired to be performed while frame learning is performed. This is because the frame transferring is performed by the destination apparatus 20-1 of the main system.

The destination management apparatus 20-2 is coupled to each of the PEs 10 through the third port p3 included in each of the PEs 10. At this time, the third pot p3 includes ports p3-1 and p3-2, and the destination management apparatus 20-1 of the main system is coupled to the third port p3-1, for example. On the other hand, the destination management apparatus 20-2 of the slave system may be coupled to the third port p3-2. Specifically, for example, as illustrated in FIG. 30, if the MAC table of the PE 10-3 does not store the address entry related to the MAC address a, the PE 10-3 receives the frame, which has the transmission destination address a and the transmission source address c, from the router R-c.

Since the MAC table MT3 does not stores the address entry related to the MAC address a, the PE 10-3 transmits the frame FR18, which has the transmission destination address a and the transmission source address c, to the destination management apparatus 20-1 of the main system and then transmits the frame FR19, which also has the transmission destination address a and the transmission source address c, to the destination management apparatus 20-2 of the slave system. Accordingly, the destination management apparatus 20-1 of the main system and the destination management apparatus 20-2 of the slave system may learn the destination of the frame based on the frames FR18 and FR19 received from the PE 10-3.

Figure 31:
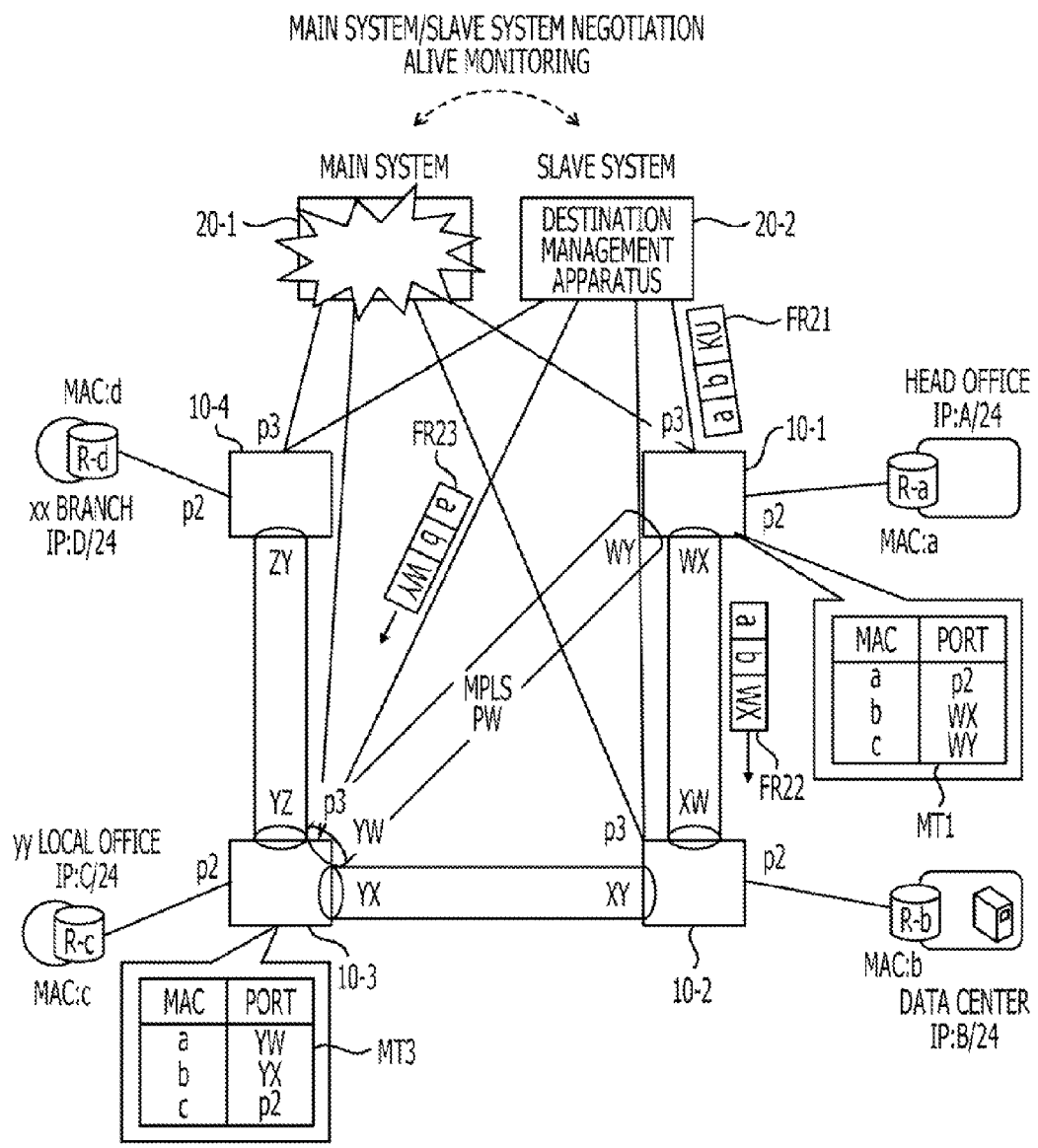
FIG. 31 is a diagram illustrating a configuration example of the transmission system according to the fifth embodiment of the present application.

In the example illustrated in FIG. 30, since no error occurs in the destination management apparatus 20-1 of the main system, the frame FR20 is transferred to the PE 10-1 by the destination management apparatus 20-1 of the main system instead of the destination management apparatus 20-1 of the slave system. The destination management apparatus 20-2 of the slave system monitors whether or not the error occurs in the destination management apparatus 20-1 of the main system. As illustrated in FIG. 31, if the destination management apparatus 20-2 of the slave system detects that the error occurs in the destination management apparatus 20-1 of the main system, the destination management apparatus 20-2 of the slave system switches the main/slave system and takes over operation that has been performed by the destination management apparatus 20-1 of the main system.

Specifically, for example, the PE 10-1 receives the frame having the transmission source address a and the transmission destination address b from the router R-a. Since the MAC table MT1 stores the address entry related to the transmission destination address b, the PE 10-1 transmits the frame FR22 added with the label WX to the PE 10-2 as the appropriate destination and then transmits the frame FR21 for learning added with the KU to the destination management apparatus 20-2 of the slave system.

Instead of the destination management apparatus 20-1 of the main system, the destination management apparatus 20-2 of the slave system, which receives the frame FR21, transfers the frame FR23 obtained by adding the label WY to the frame FR21. According to the present embodiment, the effect equivalent to the above-described embodiments and deformation examples may be achieved. Furthermore, even if the error occurs in the destination management apparatus 20, generation of the flooding processing may be suppressed.

[7] Usage Example of CW

Figure 32:
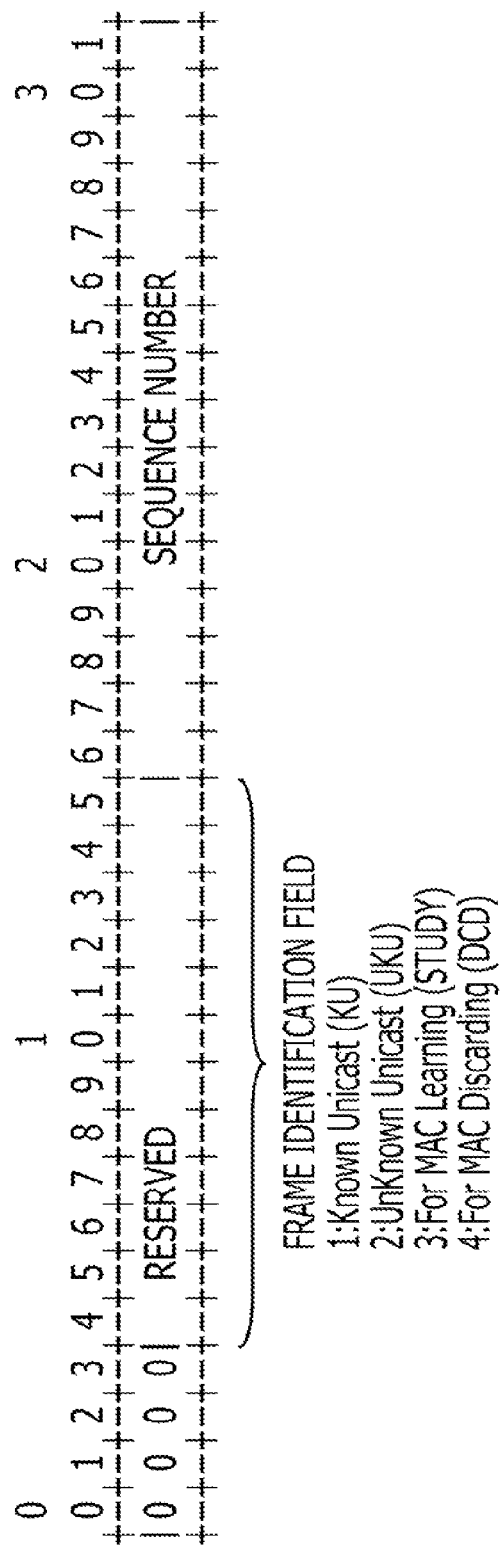
FIG. 32 is a diagram illustrating an example of a method for adding identification information to a frame.

As illustrated in FIG. 32, the above-destination frame is configured with, for example, a layer 2 (L2) header, a Tunnel Label of 4 byte, a Pseudo Wire (PW) Label of 4 byte, a CW of 4 byte, and a MAC frame. As illustrated in FIG. 32, the above-destination frame is configured with, for example, a layer 2 (L2) header, a Tunnel Label of 4 byte, a Pseudo Wire (PW) Label of 4 byte, a CW of 4 byte, and a MAC frame. The CW may be used as an option.

Identification information (a frame type) such as the above-described UKU, KU, STUDY, and DCD may be set as an option area to the CW. In this case, the CW includes at least a Reserved area and a Sequence Number area. Therefore, in the present example, for example, the Reserved area included in the CW may be used as an area for frame identification (a frame identification field).

Specifically, for example, 1 may be set to the Reserved area if the KU is added to the frame, 2 may be set to the Reserved area if the UKU is added to the frame, 3 may be set to the Reserved area if the STUDY is added to the frame, and 4 may be set to the Reserved area if the DCD is added to the frame. As a result, according to the present example, the above-described embodiments and deformation examples may be achieved without greatly changing the frame configuration.

[8] Others

The above-described transmission system, a transmission apparatus 10, a destination management apparatus 20, a control unit, the components of the transmission control program, the units, and the function may be appropriately selected or combined with each other. That is, the components of the transmission control program, the units, and the function may be appropriately selected or may be appropriately combined with each other, so that the functions of the present application may be achieved.

At least one of the components included in the above-described network may be the transmission apparatus 10. All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A transmission system comprising:
   a plurality of transmission apparatuses to transmit a frame in a network; and
   a destination management apparatus that includes,
      a plurality of first ports coupled to the plurality of transmission apparatuses to transmit and receive the frame; and
      first circuitry configured,
      to manage a first address entry which indicates a relation between the first port which receives the frame from among the plurality of first ports and a transmission source address included in the frame; and
      to transfer the frame received by one of the plurality of first ports, to the first port in association with the transmission destination address from among the plurality of first ports based on the address entry;
   wherein one of the plurality of transmission apparatuses includes,
      a plurality of second ports coupled to transmit and receive the frame from at least one other transmission apparatuses in the network;
      a third port which is coupled to the destination management apparatus;
      a storage unit to store a second address entry indicating a relation between the second port which receives the frame from among the plurality of second ports and the transmission destination address included in the frame; and
      second circuitry configured to transmit the frame received by one of the plurality of second ports only to the third port instead of the plurality of second ports, when the second address entry related to the transmission destination address included in the frame is not stored in the storage unit.

2. The transmission system according to claim 1, wherein when the second address entry related to the transmission destination address included in the frame received by one of the plurality of second ports is stored in the storage unit, the second circuitry is configured to transmit the frame received by one of the plurality of second ports to the third port and the second port in association with the transmission destination address from among the plurality of second ports.

3. The transmission system according to claim 1, wherein when the second address entry related to the transmission destination address included in the frame received by one of the plurality of second ports is not stored in the storage unit, the second circuitry is configured to add a piece of first identification information indicating that the frame received by one of the second ports is unlearned to the frame, and
   when the second address entry related to the transmission destination address is stored in the storage unit, the second circuitry is configured to add a piece of second identification information, indicating that the frame received by one of the plurality of second ports is learned, to the frame.

4. The transmission system according to claim 1, wherein the third port receives the frame, which is added with a label having a piece of label information indicating at least a transmission source of the frame, from the destination management apparatus, and
   the storage unit stores the second address entry indicating the relation between the transmission source address included in the frame with the label received by the third port and the second port coupled to the transmission source of the frame indicated by the label information from among the plurality of second ports.

5. The transmission system according to claim 1, wherein the first circuitry is configured to determine a transfer destination of the frame based on a prescribed piece of identification information included in the frame received by one of the plurality of first ports.

6. A transmitting method of a transmission system including a destination managing apparatus including a plurality of first ports and a first memory configured to store a first address entry indicating a relation between one of the plurality of first ports and an address corresponding to the one of the plurality of first ports, and a transmission apparatus including a plurality of second ports, a third port, and a second memory configured to store a second address entry indicating a relation between one of the plurality of second ports and an address corresponding to the one of the plurality of second ports, the transmitting method comprising:
   receiving, by the transmission apparatus, a frame including a transmission destination address;
   transmitting, by the transmission apparatus, the frame from a port corresponding to the transmission destination address among the plurality of second ports and transmitting, by the transmission apparatus, the frame from the third port to the destination managing apparatus, when the second address entry related to the transmission destination address is stored in the second memory;

transmitting, by the transmission apparatus, the frame from the third port instead of the plurality of second ports to only the destination managing apparatus to cause the destination managing apparatus to determine whether to execute a flooding processing for the frame, when the second address entry related to the transmission destination address is not stored in the second memory;

storing, by the destination managing apparatus, a transmission source address extracted from the frame and information of a reception port of the frame among the plurality of first ports in the first memory to update the first address entry;

transmitting, by the destination managing apparatus, the frame from a port corresponding to the transmission destination address among the plurality of first ports, when the first address entry related to the transmission destination address is stored in the first memory; and executing, by the destination managing apparatus, the flooding processing by transmitting the frame from the plurality of first ports except for the reception port, when the first address entry related to the transmission destination address is not stored in the first memory.

7. The transmitting method according to claim 6, further comprising:

transmitting, by the transmission apparatus, the frame received by one of the plurality of second ports to the third port and the second port in association with the transmission destination address from among the plurality of second ports, when the second address entry related to the transmission destination address is stored in the second memory.

8. The transmitting method according to claim 6, further comprising:

adding, by the transmission apparatus, a piece of first identification information indicating that the frame is unlearned to the frame, when the second address entry related to the transmission destination address is not stored in the second memory; and adding, by the transmission apparatus, a piece of second identification information indicating that the frame is learned to the frame, when the second address entry related to the transmission destination address is stored in the second memory.

9. The transmitting method according to claim 6, further comprising:

receiving, by the third port of the transmission apparatus, the frame which is added with a label having a piece of label information indicating at least a transmission source of the frame, from the destination management apparatus; and storing, by the transmission apparatus, the second address entry related to the relation between the transmission source address included in the frame with the label received by the third port and the second port coupled to the transmission source of the frame indicated by the label information from among the plurality of second ports in the second memory.

10. The transmitting method according to claim 6, further comprising:

determining, by the destination managing apparatus, a transfer destination of the frame based on a prescribed piece of identification information included in the frame received by one of the plurality of first ports.

* * * * *